United States Patent
Zhao et al.

(10) Patent No.: US 9,876,627 B2
(45) Date of Patent: Jan. 23, 2018

(54) METHOD AND DEVICE FOR COMMUNICATION PROCESSING

(71) Applicant: China Academy of Telecommunications Technology, Beijing (CN)

(72) Inventors: Yali Zhao, Beijing (CN); Fangli Xu, Beijing (CN); Zhe Fu, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 133 days.

(21) Appl. No.: 14/764,735

(22) PCT Filed: Jan. 20, 2014

(86) PCT No.: PCT/CN2014/070916
§ 371 (c)(1),
(2) Date: Jul. 30, 2015

(87) PCT Pub. No.: WO2014/121687
PCT Pub. Date: Aug. 14, 2014

(65) Prior Publication Data
US 2015/0372798 A1 Dec. 24, 2015

(30) Foreign Application Priority Data
Feb. 5, 2013 (CN) .......................... 2013 1 0045922

(51) Int. Cl.
*H04J 3/00* (2006.01)
*H04L 5/14* (2006.01)
(Continued)

(52) U.S. Cl.
CPC ............. *H04L 5/14* (2013.01); *H04B 7/2656* (2013.01); *H04L 5/1469* (2013.01);
(Continued)

(58) Field of Classification Search
None
See application file for complete search history.

(56) References Cited

U.S. PATENT DOCUMENTS

| 2011/0211503 A1 | 9/2011 | Che et al. |
| 2013/0194982 A1* | 8/2013 | Fwu .................. H04W 72/0493 370/280 |

(Continued)

FOREIGN PATENT DOCUMENTS

| CN | 102204154 | 9/2011 |
| CN | 102651662 | 8/2012 |

(Continued)

OTHER PUBLICATIONS

International Search Report for PCT/CN2014/070916 dated Apr. 30, 2014.
(Continued)

*Primary Examiner* — Edan Orgad
*Assistant Examiner* — Rebecca Song
(74) *Attorney, Agent, or Firm* — Foley & Lardner LLP

(57) ABSTRACT

A method for communication processing are provided. The method comprises: a User Equipment (UE) reports capability indication information to a network side device in order to indicate whether the UE supports a dynamic Time Division Duplex (TDD) uplink/downlink configuration; and if the dynamic TDD uplink/downlink configuration is supported, when a TDD uplink/downlink configuration indication is received, one is selected from the indicated TDD uplink/downlink configuration and the currently used TDD uplink/downlink configuration, and a transmission direction of each sub-frame is determined according to the selected TDD uplink/downlink configuration. The method can address the problem that the transmission direction of sub-frames can not be determined in the scenario.

17 Claims, 7 Drawing Sheets

(51) Int. Cl.
*H04B 7/26* (2006.01)
*H04W 72/04* (2009.01)
*H04W 28/18* (2009.01)
*H04L 5/18* (2006.01)

(52) U.S. Cl.
CPC ....... *H04W 28/18* (2013.01); *H04W 72/0406* (2013.01); *H04W 72/0446* (2013.01); *H04L 5/1438* (2013.01); *H04L 5/18* (2013.01)

(56) References Cited

U.S. PATENT DOCUMENTS

| | | | |
|---|---|---|---|
| 2013/0272170 A1* | 10/2013 | Chatterjee | H04W 28/02 370/280 |
| 2014/0040694 A1* | 2/2014 | Verma | H04L 1/1812 714/748 |
| 2014/0086112 A1* | 3/2014 | Stern-Berkowitz | H04W 72/1289 370/280 |
| 2014/0198680 A1* | 7/2014 | Siomina | H04L 5/14 370/252 |

FOREIGN PATENT DOCUMENTS

| | | |
|---|---|---|
| CN | 102740477 | 10/2012 |
| EP | 2498419 | 9/2012 |
| EP | 2 901 599 A1 | 8/2015 |
| KR | 10-2012-0103200 | 9/2012 |
| WO | WO-2012/113131 | 8/2012 |
| WO | WO-2012/113330 | 8/2012 |
| WO | WO-2012/130179 | 10/2012 |
| WO | WO-2014/069105 | 5/2014 |

OTHER PUBLICATIONS

Extended European Search Report for EP Application No. 14748790.4 dated Dec. 3, 2015.
R1-121709,"Specification impact of TDD traffic adaption" Ericsson, ST-Ericsson, Jeju, Korea, Mar. 26-30, 2012. (4 pages).

* cited by examiner

--Prior Art--

METHOD AND DEVICE FOR COMMUNICATION PROCESSING

This application is a US National Stage of International Application No. PCT/CN2014/070916, filed on Jan. 20, 2014, designating the United States and claiming the priority of Chinese Patent Application No. 201310045922.X, filed with the State Intellectual Property Office of People's Republic of China on Feb. 5, 2013 and entitled "Communication processing method and device", the content of which is hereby incorporated by reference in its entirety.

FIELD

The present invention relates to the field of communications and particularly to a communication processing method and device.

BACKGROUND

The usual Time Division Duplex (TDD) systems include the Time Division-Synchronous Code Division Multiple Access (TD-SCDMA) system in 3G network and the Time Division-Long Term Evolution (TD-LTE) system in 4G network.

FIG. 1 illustrates a frame structure in the LTE TDD system, where a radio frame has a length of 10 ms and includes ten subframes in total, including a special subframe and normal subframes, each of which has a length of 1 ms. The special subframe includes three slots including a Downlink Pilot Slot (DwPTS), a Guard Period (GP), and an Uplink Pilot Slot (UpPTS). The normal subframes are further categorized into uplink subframes and downlink subframes in which uplink/downlink control signaling, traffic data, etc., are transmitted respectively.

Seven TDD uplink (UL)/downlink (DL) configurations as depicted in Table 1 are defined in the LTE TDD system. In the seven TDD UL/DL configurations, the subframe #0 and the subframe #5, and the DwPTS slot in the special subframe are always used for downlink transmission; the subframe #2, and the UpPTS slot in the special subframe are always used for uplink transmission; and the other subframes can be configured for uplink transmission or downlink transmission as needed.

TABLE 1

LTE TDD UL/DL configurations

| Configuration no. | Subframe index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D represents a downlink subframe, S represents a special subframe, and U represents an uplink subframe.

Static and semi-static TDD uplink/downlink configurations are typically applied in TDD systems earlier than the LTE R11. In the static TDD uplink/downlink configuration, it is a common practice to plan the network by determining and maintaining an uplink/downlink proportion according to the type of a cell and a general traffic proportion. In the semi-static TDD uplink/downlink configuration, the TDD configuration is altered during the system message updating procedure, the update periodicity of which is typically several days or even a longer period. The semi-static TDD configuration is updated particularly as follows: a User Equipment (UE, also referred to as a terminal) firstly fetches a paging message, and if the paging message indicates that the system message has been updated, then the UE fetches an existing TDD Configuration Information Element (TDD-config) in the SIB1 in a next system message modification periodicity to obtain the updated TDD configuration.

The Enhancement to LTE TDD for DL-UL Interference Management and Traffic Adaptation (eIMTA) mechanism supporting the dynamic TDD UL/DL configuration has been introduced to the LTE R11. The dynamic TDD UL/DL configuration can be altered per cell or per UE.

Once the TDD UL/DL configuration of the UE needs to be altered due to the dynamic TDD UL/DL configuration, an eNB needs to notify the UE, and at present there are the following several possible notification schemes for the dynamic TDD UL/DL configuration:

The scheme 1: a broadcast notification.

The scheme 1 can be further performed into the following three implementations:

In the implementation 1.1, a TDD UL/DL configuration notification Information Element (IE) is introduced to a Master Information Block (MIB), and the UE is notified of the updated TDD UL/DL configuration in the MIB, where the UE is forced to read the MIB at least once every several ms which can be a TDD UL/DL configuration update periodicity.

In the implementation 1.2, the R8 system message update procedure is reused, and the UE is notified of the updated TDD UL/DL configuration in the SIB1 or the MIB or another SIB.

In the implementation 1.3, the R10 Earthquake and Tsunami Warning System (ETWS) notification procedure is reused, that is, firstly the UE is paged to be notified that the TDD UL/DL configuration is altered, and then the UE reads a TDD UL/DL configuration indicator added to the SIB1 to obtain the updated TDD UL/DL configuration.

The scheme 2: the Radio Resource Control (RRC) signaling, that is, the UE is notified of the altered TDD UL/DL configuration in Radio Resource Control (RRC) signaling.

The scheme 3: the Media Access Control (MAC) signaling, that is, the UE is notified of the altered TDD UL/DL configuration in the MAC Control Element (CE).

The scheme 4: the Physical Downlink Control Channel (PDCCH), that is, the UE is notified of the altered TDD UL/DL configuration in a Physical Downlink Control Channel (PDCCH).

The shortest TDD UL/DL reconfiguration interval supported in the respective schemes is as depicted in Table 2:

TABLE 2

The shortest TDD UL/DL reconfiguration interval

| | Scheme | | | | | |
|---|---|---|---|---|---|---|
| | Scheme 1.1 | Scheme 1.2 | Scheme 1.3 | Scheme 2 | Scheme 3 | Scheme 4 |
| The shortest reconfiguration interval (ms) | 40 | 640 | 320 | 200 | 10 | 10 |

The respective notification schemes are applicable to the reconfiguration of the TDD UL/DL configuration per cell, but only the respective other schemes than the scheme 1 can be applicable to the TDD UL/DL reconfiguration notification per UE.

Due to the dynamic TDD uplink/downlink configuration introduced to the LTE R11, the UE may receive two TDD UL/DL configurations at the same time or in sequence, and in this case, transmission directions of the respective subframes can not be determined for the UE in the solution in the prior art.

SUMMARY

An object of the invention is to provide a communication processing method and device so as to address the problem of how to determine a transmission direction of a subframe for a UE.

The object of the invention is attained in the following technical solutions:

A communication processing method includes:

reporting, by a UE, a capability indicator to a network-side device to indicate whether the UE supports a dynamic time division duplex uplink/downlink configuration; and if the UE supports a dynamic time division duplex uplink/downlink configuration, then selecting, by the UE, one of an indicated time division duplex uplink/downlink configuration and a currently used time division duplex uplink/downlink configuration upon reception of a time division duplex uplink/downlink configuration indicator, and determining transmission directions of respective subframes according to the selected time division duplex uplink/downlink configuration.

A communication processing method includes:

determining, by a network-side device, whether a UE supports a dynamic time division duplex uplink/downlink configuration, according to a capability indicator reported by the UE; and if the UE supports a dynamic time division duplex uplink/downlink configuration, then after transmitting a time division duplex uplink/downlink configuration indicator to the UE, selecting, by the network-side device, one of an indicated time division duplex uplink/downlink configuration and a time division duplex uplink/downlink configuration currently used by the UE, and determining transmission directions of respective subframes for the UE according to the selected time division duplex uplink/downlink configuration.

A UE includes:

a capability reporting module configured to report a capability indicator to a network-side device to indicate whether the UE supports a dynamic time division duplex uplink/downlink configuration; and a subframe transmission direction determining module configured, if the UE supports a dynamic time division duplex uplink/downlink configuration, to select one of an indicated time division duplex uplink/downlink configuration and a currently used time division duplex uplink/downlink configuration upon reception of a time division duplex uplink/downlink configuration indicator, and to determine transmission directions of respective subframes according to the selected time division duplex uplink/downlink configuration.

A network-side device includes:

a configuration mode support determining module configured to determine whether a UE supports a dynamic time division duplex uplink/downlink configuration, according to a capability indicator reported by the UE; and a subframe transmission direction determining module configured, if the UE supports a dynamic time division duplex uplink/downlink configuration, after a time division duplex uplink/downlink configuration indicator is transmitted to the UE, to select one of an indicated time division duplex uplink/downlink configuration and a time division duplex uplink/downlink configuration currently used by the UE, and to determine transmission directions of respective subframes for the UE according to the selected time division duplex uplink/downlink configuration.

In the embodiments of the invention, the UE supporting a dynamic time division duplex uplink/downlink configuration selects one of the indicated time division duplex uplink/downlink configuration and the currently used time division duplex uplink/downlink configuration upon reception of the time division duplex uplink/downlink configuration indicator to thereby determine transmission directions of respective subframes so as to address the problem in the art of failing to determine the transmission directions of the subframes in this scenario.

BRIEF DESCRIPTION OF THE DRAWINGS

FIG. 1 illustrates a schematic diagram of the frame structure in the LTE TDD system in the prior an;

DETAILED DESCRIPTION OF THE EMBODIMENTS

In the embodiments of the invention, a UE reports a capability indicator to a network-side device to indicate whether the UE supports a dynamic TDD uplink/downlink configuration: and if the UE supports the dynamic TDD uplink/downlink configuration, then the UE selects one of an indicated TDD uplink/downlink configuration and a currently used TDD uplink/downlink configuration upon reception of a TDD uplink/downlink configuration indicator, and determines transmission directions of respective subframes according to the selected TDD uplink/downlink configuration. The network-side device determines whether the UE supports a dynamic TDD uplink/downlink configuration, according to the capability indicator reported by the UE; and if the UE supports a dynamic TDD uplink/downlink configuration, then the network-side device selects one of the indicated TDD uplink/downlink configuration and the TDD uplink/downlink configuration currently used by the UE when the network-side device transmits the TDD uplink/downlink configuration indicator, and determines the transmission directions of the respective subframes for the UE according to the selected TDD uplink/downlink configuration. The technical solutions according to the embodiments of the invention address the problem in the prior art that the UE supporting a dynamic TDD uplink/downlink configuration fails to determine the transmission direction of the subframe upon reception of the TDD uplink/downlink configuration indicator.

The technical solutions according to the embodiments of the invention will be described below in details with reference to the drawings.

Figure 1:
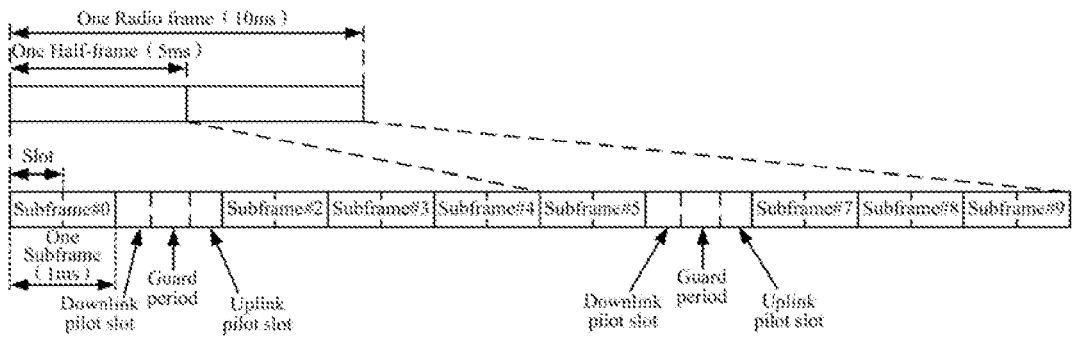
Figure 2:
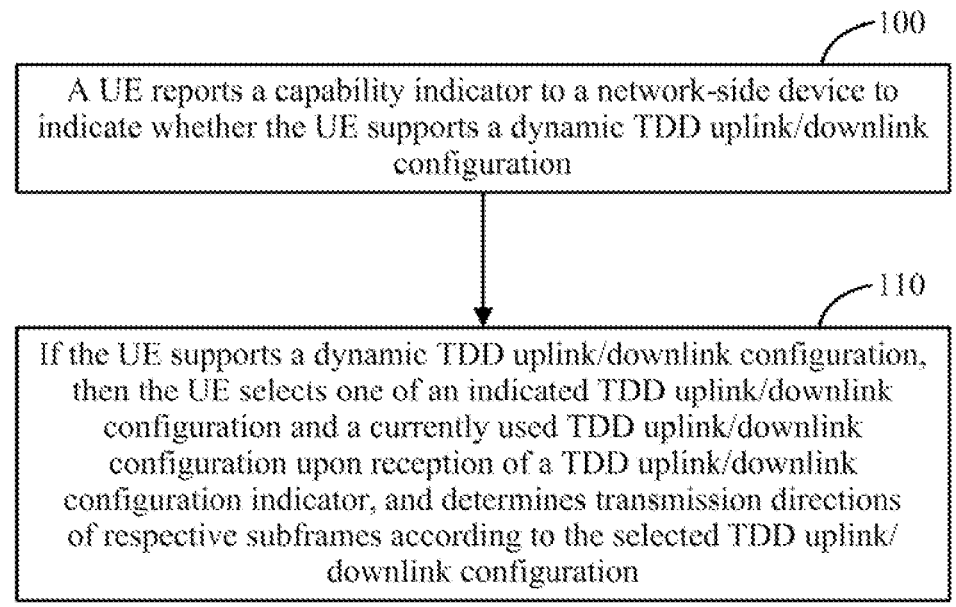
FIG. 2 illustrates a flow chart of a communication processing method at the UE side according to an embodiment of the invention.

FIG. 2 illustrates a communication processing method at the UE side according to an embodiment of the invention in a particular implementation including the following operations:

Step 100: A UE reports a capability indicator to a network-side device to indicate whether the UE supports a dynamic TDD uplink/downlink configuration.

Step 110: If the UE supports a dynamic TDD uplink/downlink configuration, then the UE selects one of an indicated TDD uplink/downlink configuration and a currently used TDD uplink/downlink configuration upon reception of a TDD uplink/downlink configuration indicator, and determines transmission direction of each subframe according to the selected TDD uplink/downlink configuration.

If the UE does not support a dynamic TDD uplink/downlink configuration, then the UE operates as in the prior art, so a repeated description thereof will be omitted here.

The TDD uplink/downlink configuration can be selected in the embodiment of the invention in a number of implementations, several of which will be listed below.

First Selection Approach

The UE selects the TDD uplink/downlink configuration indicated by the TDD uplink/downlink configuration indicator.

Stated differently, the UE selects the uplink/downlink configuration indicated by the TDD uplink/downlink configuration regardless of whether the TDD uplink/downlink configuration indicator is a dynamic TDD uplink/downlink configuration indicator or a static or semi-static TDD uplink/downlink configuration indicator.

Correspondingly the UE may store only one TDD uplink/downlink configuration, and replace the stored TDD uplink/downlink configuration with the indicated TDD uplink/downlink configuration upon reception of the TDD uplink/downlink configuration indicator. The stored TDD uplink/downlink configuration is the currently used TDD uplink/downlink configuration.

In other words, the UE selects the indicated TDD uplink/downlink configuration, and replaces the stored TDD uplink/downlink configuration with the indicated TDD uplink/downlink configuration, upon reception of the TDD uplink/downlink configuration indicator.

The UE may alternatively store two TDD uplink/downlink configurations including a statically or semi-statically configured TDD uplink/downlink configuration and a dynamically configured TDD uplink/downlink configuration, so that the UE searches for the TDD uplink/downlink configuration stored by the UE in the same configuration mode as the indicated TDD uplink/downlink configuration, and replaces the stored TDD uplink/downlink configuration with the indicated TDD uplink/downlink configuration, where the TDD uplink/downlink configuration currently used by the UE is one of the stored TDD uplink/downlink configurations.

In other words, the UE selects the indicated TDD uplink/downlink configuration, and replaces the stored TDD uplink/downlink configuration in the same configuration mode as the indicated TDD uplink/downlink configuration, upon reception of the TDD uplink/downlink configuration indicator.

In the embodiment of the invention, the configuration mode of the TDD uplink/downlink configuration can be static configuration or semi-static configuration or can be dynamic configuration. The configuration mode of the TDD uplink/downlink configuration indicated by the TDD uplink/downlink configuration indicator can be determined according to a notification scheme of the indicator. For example, the TDD uplink/downlink configuration indicator can be transmitted in a system message specified in the existing LTE R8 standard to indicate the TDD uplink/downlink configuration as statically or semi-statically configured. The TDD uplink/downlink configuration indicator can be transmitted in a prescribed dynamic TDD uplink/downlink configuration notification scheme to indicate the TDD uplink/downlink configuration as dynamically configured. The configuration mode of the stored TDD uplink/downlink configuration can be determined by a configuration identifier being associated with a stored configuration.

Second Selection Approach

The UE determines whether the TDD uplink/downlink configuration indicator is a dynamic TDD uplink/downlink configuration indicator, and if so, then the UE selects the indicated TDD uplink/downlink configuration; otherwise, the UE selects the currently used TDD uplink/downlink configuration.

Correspondingly the UE may store only one TDD uplink/downlink configuration, and replace the stored TDD uplink/downlink configuration with the indicated TDD uplink/downlink configuration upon determining that the TDD uplink/downlink configuration indicator is a dynamic TDD uplink/downlink configuration as a result of determining whether it is a dynamic TDD uplink/downlink configuration. The UE stores only one TDD uplink/downlink configuration, which is the currently used TDD uplink/downlink configuration.

Figure 3:
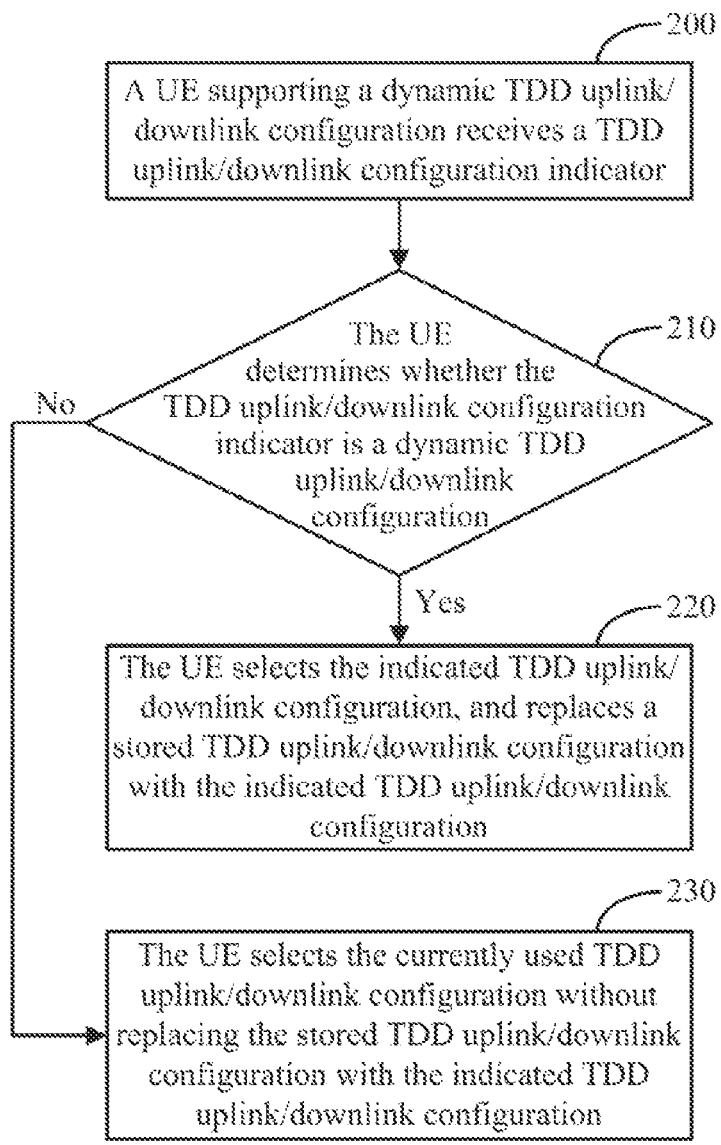
FIG. 3 illustrates a first flow chart of selecting and storing a TDD uplink/downlink configuration at the UE side according to an embodiment of the invention.

Correspondingly the TDD uplink/downlink configuration is selected and stored in an implementation as illustrated in FIG. 3:

Step 200: A UE supporting a dynamic TDD uplink/downlink configuration receives a TDD uplink/downlink configuration indicator;

Step 210: The UE determines whether the TDD uplink/downlink configuration indicator is a dynamic TDD uplink/downlink configuration, and if so, then the UE proceeds to the step 220; otherwise, the UE proceeds to the step 230;

Step 220: The UE selects the indicated TDD uplink/downlink configuration, and replaces a stored TDD uplink/downlink configuration with the indicated TDD uplink/downlink configuration; and Step 230: The UE selects the currently used TDD uplink/downlink configuration without replacing the stored TDD uplink/downlink configuration with the indicated TDD uplink/downlink configuration.

The UE may alternatively store two TDD uplink/downlink configurations including a statically or semi-statically configured TDD uplink/downlink configuration and a dynamically configured TDD uplink/downlink configuration. The UE searches for the TDD uplink/downlink configuration stored by the UE in the same configuration mode as the indicated TDD uplink/downlink configuration, and replaces the stored TDD uplink/downlink configuration with the indicated TDD uplink/downlink configuration, and replaces the stored TDD uplink/downlink configuration with the indicated TDD uplink/downlink configuration upon determining that the TDD uplink/downlink configuration indicator is a dynamic TDD uplink/downlink configuration as a result of determining whether it is a dynamic TDD uplink/downlink configuration. The TDD uplink/downlink configuration currently used by the UE is one of the stored TDD uplink/downlink configurations.

Figure 4:
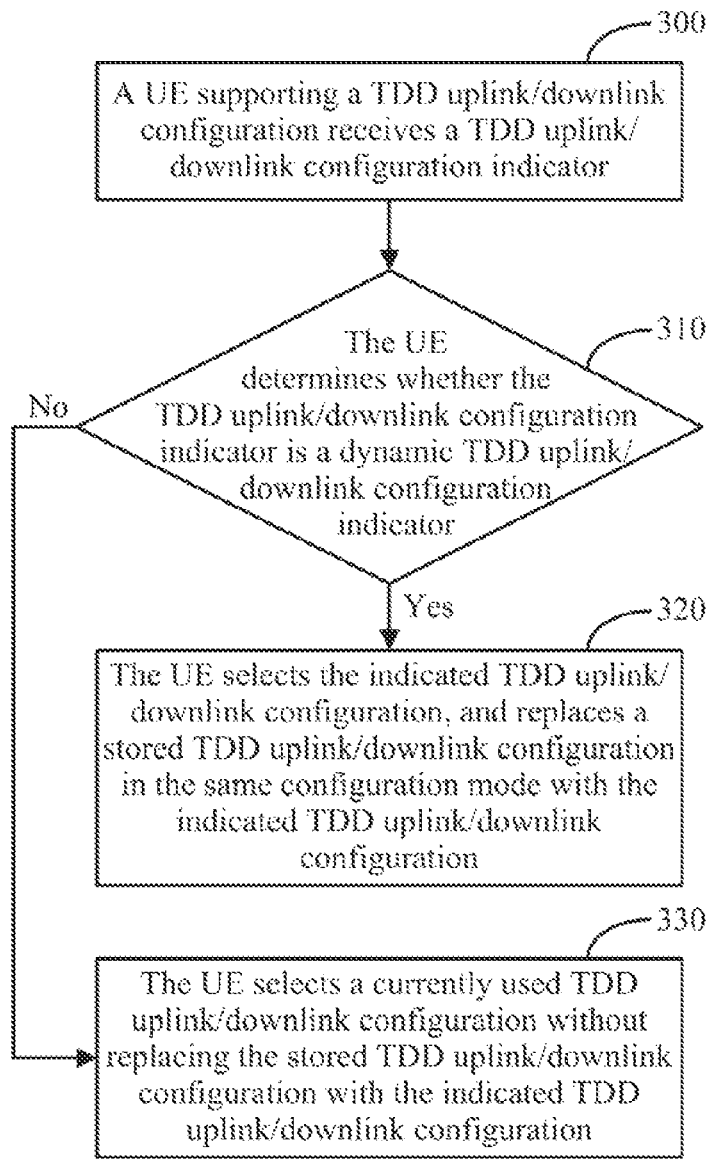
FIG. 4 illustrates a second flow chart of selecting and storing a TDD uplink/downlink configuration at the UE side according to an embodiment of the invention.

Correspondingly the TDD uplink/downlink configuration is selected and stored in an implementation as illustrated in FIG. 4:

Step 300: A UE supporting a TDD uplink/downlink configuration receives a TDD uplink/downlink configuration indicator;

Step 310: The UE determines whether the TDD uplink/downlink configuration indicator is a dynamic TDD uplink/downlink configuration indicator, and if so, then the UE proceeds to the step 320; otherwise, the UE proceeds to the step 330;

Step 320: The UE selects the indicated TDD uplink/downlink configuration, and replaces a stored TDD uplink/downlink configuration, which is in the same configuration mode as the indicated TDD uplink/downlink configuration, with the indicated TDD uplink/downlink configuration; and Step 330: The UE selects a currently used TDD uplink/downlink configuration without replacing the stored TDD uplink/downlink configuration with the indicated TDD uplink/downlink configuration.

If both a static or semi-static TDD uplink/downlink configuration indicator and a dynamic TDD uplink/downlink configuration indicator are received, then correspondingly the UE can make the selection as follows:

The UE selects the TDD uplink/downlink configuration indicated by the dynamic TDD uplink/downlink configuration indicator.

The UE may store only one TDD uplink/downlink configuration, and correspondingly the UE replaces the stored TDD uplink/downlink configuration with the TDD uplink/downlink configuration indicated by the dynamic TDD uplink/downlink configuration indicator upon reception of the TDD uplink/downlink configuration indicator. The stored TDD uplink/downlink configuration is the currently used TDD uplink/downlink configuration.

In other words, the UE selects the TDD uplink/downlink configuration indicated by the dynamic one of the TDD uplink/downlink configuration indicators, and replaces the stored TDD uplink/downlink configuration therewith, upon reception of the TDD uplink/downlink configuration indicators.

The UE may alternatively store two TDD uplink/downlink configurations, and correspondingly the UE replaces the stored TDD uplink/downlink configuration, which is in the same configuration mode as the configuration indicated by the dynamic TDD uplink/downlink configuration indicator, with the TDD uplink/downlink configuration indicated by the dynamic TDD uplink/downlink configuration indicator, and replaces the stored TDD uplink/downlink configuration, which is in the same configuration mode as the configuration indicated by the static or semi-static TDD uplink/downlink configuration indicator, with the TDD uplink/downlink configuration indicated by the static or semi-static TDD uplink/downlink configuration indicator. The TDD uplink/downlink configuration currently used by the UE is one of the stored TDD uplink/downlink configurations.

In other words, the UE selects the TDD uplink/downlink configuration indicated by the dynamic one of the TDD uplink/downlink configuration indicators, and replaces the stored TDD uplink/downlink configuration, which is in the same configuration mode as the dynamic one, therewith, upon reception of the TDD uplink/downlink configuration indicators.

If both a static or semi-static TDD uplink/downlink configuration indicator and a dynamic TDD uplink/downlink configuration indicator are received, then correspondingly the UE can alternatively make the selection as follows:

The UE selects the TDD uplink/downlink configuration indicated by the static or semi-static TDD uplink/downlink configuration indicator.

The UE may store only one TDD uplink/downlink configuration, and correspondingly the UE replaces the stored TDD uplink/downlink configuration with the TDD uplink/downlink configuration indicated by the static or semi-static TDD uplink/downlink configuration indicator upon reception of the TDD uplink/downlink configuration indicator. The stored TDD uplink/downlink configuration is the currently used TDD uplink/downlink configuration.

In other words, the UE selects the TDD uplink/downlink configuration indicated by the static or semi-static one of the TDD uplink/downlink configuration indicators, and replaces the stored TDD uplink/downlink configuration therewith, upon reception of the TDD uplink/downlink configuration indicators.

The UE may alternatively store two TDD uplink/downlink configurations, and correspondingly the UE replaces the stored TDD uplink/downlink configuration, in the same configuration mode as the dynamic TDD uplink/downlink configuration, with the TDD uplink/downlink configuration indicated by the dynamic TDD uplink/downlink configuration indicator, and replaces the stored TDD uplink/downlink configuration, in the same configuration mode as the static or semi-static TDD uplink/downlink configuration, with the TDD uplink/downlink configuration indicated by the static or semi-static TDD uplink/downlink configuration indicator. The TDD uplink/downlink configuration currently used by the UE is one of the stored TDD uplink/downlink configurations.

In other words, the UE selects the TDD uplink/downlink configuration indicated by the dynamic one of the TDD uplink/downlink configuration indicators, and replaces the stored TDD uplink/downlink configuration in the same configuration mode therewith, upon reception of the TDD uplink downlink configuration indicators.

After the transmission directions of the subframes are determined in any one of the embodiments above of the method at the UE side, such a situation may arise in which a transmission direction predetermined for a subframe is different from the transmission direction determined above, and in order to address the problem of data transmission in this situation, the following several data processing approaches will be listed in the embodiments of the invention:

First Data Processing Approach:

When data need to be transmitted, if a predetermined transmission direction of a subframe carrying the data to be transmitted is different from the transmission direction determined according to the selected TDD uplink/downlink configuration, then the UE stops the data to be transmitted from being transmitted in the subframe carrying the data to be transmitted.

Particularly if the network-side device configures the UE with uplink or downlink Semi-Persistent Scheduling (SPS), and a transmission direction of a subframe of the UE including a resource preconfigured for uplink or downlink SPS is changed, that is, uplink or downlink SPS data are transmitted in the subframe carrying the data to be transmitted, then the transmission direction predetermined for the subframe is different from the transmission direction according to the selected TDD uplink/downlink configuration, then the UE stops the uplink or downlink SPS data from being transmitted in the corresponding subframe.

Taking downlink SPS as an example, if a downlink SPS resource is configured at a periodicity of 20 ms, and the SPS resource is transmitted in the subframe #3 in an even-numbered radio frame, then once the TDD uplink/downlink configuration is changed so that the transmission direction of the subframe #3 in some even-numbered radio frame (e.g., with a System Frame Number (SFN)=6) is changed from the downlink to the uplink, so the current downlink SPS transmission is stopped in the subframe.

At the UE side, stopping downlink SPS transmission refers to stopping the SPS resource from being received in the corresponding subframe.

For uplink SPS transmission, stopping uplink SPS transmission refers to stopping the SPS resource from being transmitted in the corresponding subframe.

Further to stopping uplink or downlink SPS transmission, the uplink or downlink SPS resource can be released or a next uplink or downlink SPS transmission occasion can be waited (e.g., in the subframe #3 with the SNF=8 in the scenario above).

Further to stopping uplink or downlink SPS transmission or releasing the uplink or downlink SPS resource, a downlink SPS traffic transmitted by the network-side device through dynamic scheduling can be received in another subframe, or an uplink SPS traffic can be transmitted in another subframe through dynamic scheduling by the network-side device, that is, dynamic scheduling of the data to be transmitted by the SPS can be received in a subframe with the same transmission direction in the selected TDD uplink/downlink configuration with the SPS.

The particular data processing approach in use can be prescribed between the UE and the network side or can be specified in a corresponding standard.

Particularly if a subframe for Physical Uplink Shared Channel (PUSCH) initial transmission/synchronized adaptive retransmission/synchronized non-adaptive retransmission scheduled dynamically for the UE is changed from the uplink to the downlink, that is, a PUSCH is initially transmitted or retransmitted in the subframe carrying the data to be transmitted, and a transmission direction predetermined for the subframe is different from the transmission direction according to the selected TDD uplink/downlink configuration, then the UE stops the PUSCH from being transmitted in the corresponding subframe.

Taking dynamically scheduled PUSCH initial transmission as an example, if the TDD uplink/downlink configuration is changed so that a subframe is changed from the uplink to the downlink at time of initial transmission, then PUSCH transmission in the current subframe can be stopped at this time, and the UE operates as follows:

The UE sets a current number of transmissions (CURRENT_TX_NB) and a current redundancy version (CURRENT_IRV) to 0;

The UE sets a feedback about acknowledgement (ACK) to Negative Acknowledgement (NACK); and The UE handles an uplink (UL) grant, and stores a corresponding MAC Packet Data Unit (PDU) in a corresponding Hybrid Automatic Repeat reQuest (HARQ) buffer without any uplink transmission.

Taking dynamically scheduled PUSCH synchronized adaptive transmission as an example, if the TDD uplink/downlink configuration is changed so that a subframe is changed from the uplink to the downlink at time of retransmission, then PUSCH transmission in the current subframe can be stopped at this time, and the UE operates as follows:

The UE sets CURRENT_TX_NB by adding one to the current value thereof;

The UE sets the value of corresponding CURRENT_IRV according to HARQ information;

The UE sets an ACK feedback to NACK; and

The UE handles a UL grant for uplink retransmission without any uplink transmission.

Furthermore the UE releases an HARQ process corresponding to the PUSCH to be transmitted in the subframe, further to stopping the PUSCH from being transmitted.

Particularly if a transmission direction of a subframe configured by the network-side device for the UE to carry a Physical Uplink Control Channel (PUCCH) and/or a Sounding Reference Signal (SRS) is changed from the uplink to the downlink because the TDD uplink/downlink configuration is changed, that is, an SRS and/or a PUCCH is transmitted in the subframe carrying the data to be transmitted, and a transmission direction predetermined for the subframe is different from the transmission direction determined according to the selected TDD uplink/downlink configuration, then the UE stops the SRS and/or the PUCCH from being transmitted in the corresponding subframe.

Furthermore the UE instructs the RRC layer to release the SRS and/or the PUCCH configuration in addition to stopping the SRS and/or the PUCCH from being transmitted.

Second Data Processing Approach

The UE releases the uplink or downlink SPS resource after determining that the UE supports a dynamic TDD uplink/downlink configuration and starts the dynamic TDD uplink/downlink configuration.

That is, if the dynamic TDD uplink/downlink configuration is started, then no SPS transmission is allowed.

The dynamic TDD uplink/downlink configuration can be decided to be enabled, upon reception of an instruction transmitted by the network-side device; or the dynamic TDD uplink/downlink configuration can be decided to be enabled upon reception of the TDD uplink/downlink configuration indicator transmitted by the network-side device.

Furthermore after the dynamic TDD uplink/downlink configuration is disabled, the UE can continue with transmission of the uplink/downlink SPS data using the SPS, either in a new SPS configuration by the network side or the previous SPS configuration.

An MAC PDU is transmitted in N consecutive Transmission Time Intervals (TTIs), where transmission in the N TTIs is regarded as transmission in a bundle, and each of the TTIs can be of the same or different redundancy versions. An HARQ feedback time for the bundle is determined by the last TTI in the bundle, and the bundle is retransmitted still in the form of a bundle at a retransmission time determined by one of TTIs in the bundle. If the first TTI is represented as n, then the bundle is retransmitted at time n+2*HARQ RTT (RTT stands for Round-Trip Time), where the HART RTT is determined by the duplex mode and the TDD uplink/downlink configuration. For the TDD. TTI bundling is only applicable in the TDD uplink/downlink configuration 0/1/16.

Then for TTI bundling, the indicated TDD uplink/downlink configuration is the TDD uplink/downlink configuration 0 or 1 or 6 in the respective embodiments above.

Figure 5:
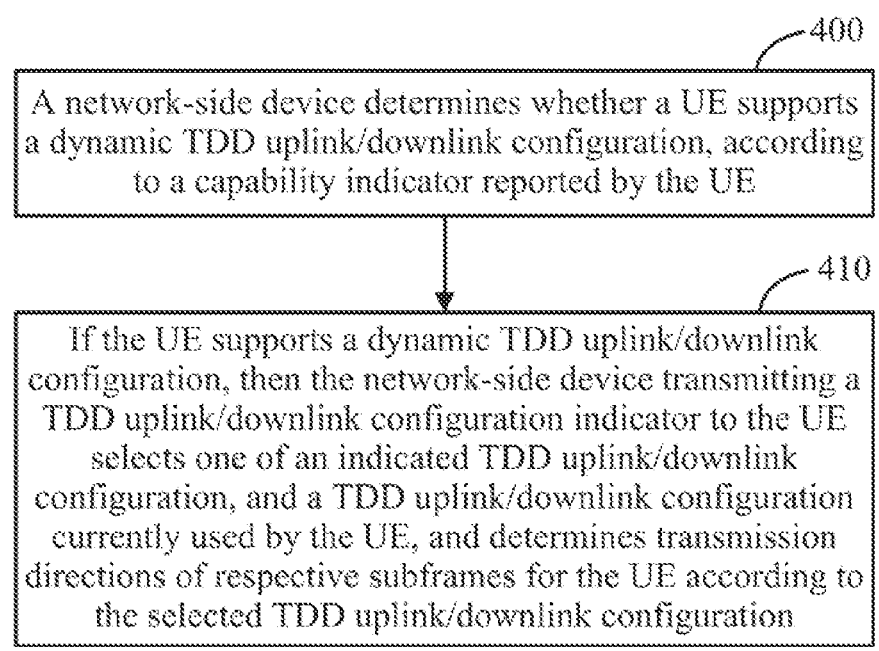
FIG. 5 illustrates a flow chart of a method at the network side according to an embodiment of the invention.

FIG. 5 illustrates a communication processing method at the network-side device according to an embodiment of the invention in a particular implementation including the following steps:

Step 400: A network-side device determines whether a UE supports a dynamic TDD uplink/downlink configuration, according to a capability indicator reported by the UE: and Step 410: If the UE supports a dynamic TDD uplink/downlink configuration, then after the network-side device transmits a TDD uplink/downlink configuration indicator to the UE, the network-side device selects one of an indicated TDD uplink/downlink configuration and a TDD uplink/downlink configuration currently used by the UE, and determines transmission directions of subframes for the UE according to the selected TDD uplink/downlink configuration.

If the UE does not support a dynamic TDD uplink/downlink configuration, then after the TDD uplink/downlink configuration is transmitted, if the indicator is transmitted in the form of a broadcast, then the network-side device determines whether the indicated TDD uplink/downlink configuration is a dynamic TDD uplink/downlink configuration; and if so, then the network-side device determines the transmission directions of the respective subframes for the UE according to the TDD uplink/downlink configuration currently used by the UE; otherwise, the network-side device determines the transmission directions of the respective subframes for the UE according to the indicated TDD uplink/downlink configuration, and replaces the TDD uplink/downlink configuration currently used by the UE with the indicated TDD uplink/downlink configuration.

The TDD uplink/downlink configuration can be selected in the embodiment of the invention in a number of implementations, several of which will be listed below.

First Selection Approach

The indicated TDD uplink/downlink configuration is selected.

Stated differently, the uplink/downlink configuration indicated by the TDD uplink/downlink configuration indicator is selected regardless of whether the TDD uplink/downlink configuration indicator is a dynamic TDD uplink/downlink configuration indicator or a static or semi-static TDD uplink/downlink configuration indicator.

Correspondingly the network-side device may store only one TDD uplink/downlink configuration of the UE, and replace the stored TDD uplink/downlink configuration of the UE with the indicated TDD uplink/downlink configuration after transmitting the TDD uplink/downlink configuration indicator, where the TDD uplink/downlink configuration of the UE stored by the network side is the TDD uplink/downlink configuration currently used by the UE.

That is, after the TDD uplink/downlink configuration indicator is transmitted, the network-side device selects the indicated TDD uplink/downlink configuration, and replaces the stored TDD uplink/downlink configuration of the UE therewith.

The network-side device may alternatively store two TDD uplink/downlink configurations of the UE including a static or semi-static TDD uplink/downlink configuration and a dynamic TDD uplink/downlink configuration, then the network-side device searches for the TDD uplink/downlink configuration of the UE stored by the network side in the same configuration mode as the indicated TDD uplink/downlink configuration, and replaces the found TDD uplink/downlink configuration of the UE with the indicated TDD uplink/downlink configuration, where the TDD uplink/downlink configuration currently used by the UE is one of the stored TDD uplink/downlink configurations of the UE.

That is, after the TDD uplink/downlink configuration indicator is transmitted, the network-side device selects the indicated TDD uplink/downlink configuration, and replaces the stored TDD uplink/downlink configuration of the UE, in the same configuration mode as the indicated configuration, with the indicated configuration.

Second Selection Approach

The network-side device determines whether the TDD uplink/downlink configuration indicator is a dynamic TDD uplink/downlink configuration indicator, and if so, then the network-side device selects the indicated TDD uplink/downlink configuration; otherwise, the network-side device selects the TDD uplink/downlink configuration currently used by the UE.

Correspondingly the network side may store only one set of TDD uplink/downlink configuration, and the network-side device replaces the stored TDD uplink/downlink configuration of the UE with the indicated TDD uplink/downlink configuration upon determining that the TDD uplink/downlink configuration indicator is a dynamic TDD uplink/downlink configuration as a result of determining whether it is a dynamic TDD uplink/downlink configuration.

Figure 6:
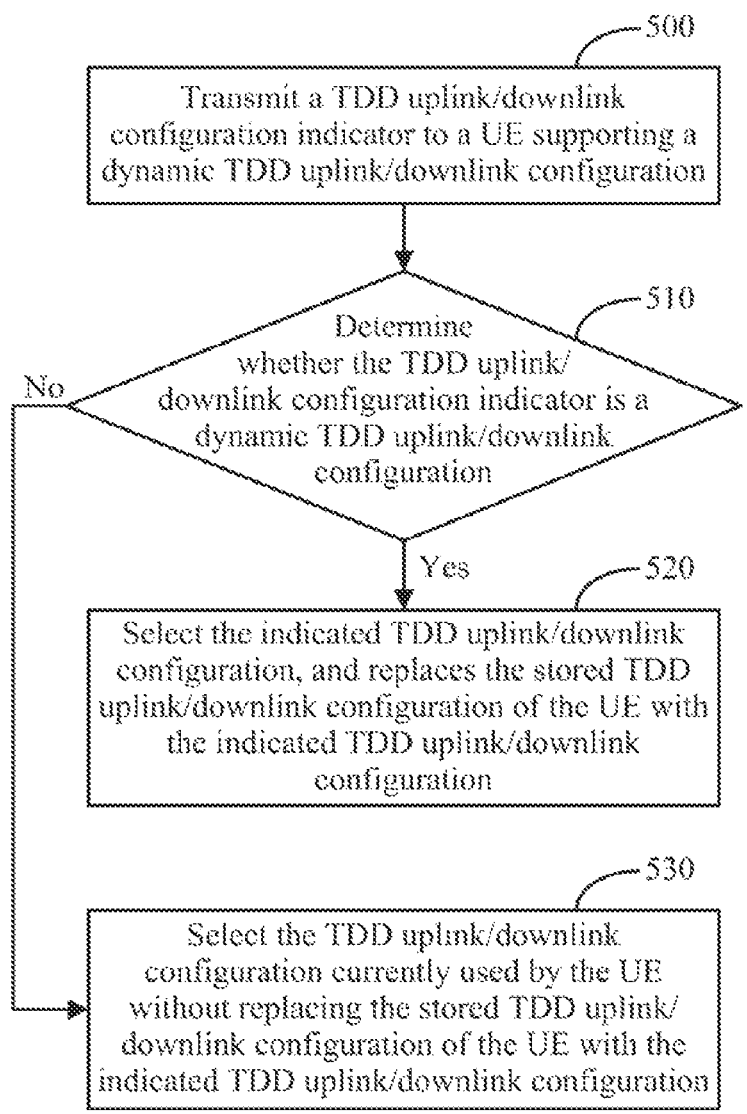
FIG. 6 illustrates a first flow chart of selecting and storing a TDD uplink/downlink configuration at the network side according to an embodiment of the invention.

Correspondingly the TDD uplink/downlink configuration is selected and stored in an implementation as illustrated in FIG. 6.

Step 500: A network-side device transmits a TDD uplink/downlink configuration indicator to a UE supporting a dynamic TDD uplink/downlink configuration;

Step 510: The network-side device determines whether the TDD uplink/downlink configuration indicator is a dynamic TDD uplink/downlink configuration indicator, and if so, then the network-side device proceeds to the step 220; otherwise, the network-side device proceeds to the step 230;

Step 520: The network-side device selects the indicated TDD uplink/downlink configuration, and replaces the stored TDD uplink/downlink configuration of the UE with the indicated TDD uplink/downlink configuration; and Step 530: The network-side device selects the TDD uplink/downlink configuration currently used by the UE without replacing the stored TDD uplink/downlink configuration of the UE with the indicated TDD uplink/downlink configuration.

The network-side device may alternatively store two TDD uplink/downlink configurations including a static or semi-static TDD uplink/downlink configuration and a dynamic TDD uplink/downlink configuration, then the network-side device searches for the TDD uplink/downlink configuration stored by the network side in the same configuration mode as the indicated TDD uplink/downlink configuration, and replaces the stored TDD uplink/downlink configuration searched out with the indicated TDD uplink/downlink configuration, upon determining that the TDD uplink/downlink configuration indicator is a dynamic TDD uplink/downlink configuration indicator as a result of determining whether it is a dynamic TDD uplink/downlink configuration indicator.

The TDD uplink/downlink configuration currently used by the UE is one of the TDD uplink/downlink configurations stored by the network-side.

Figure 7:
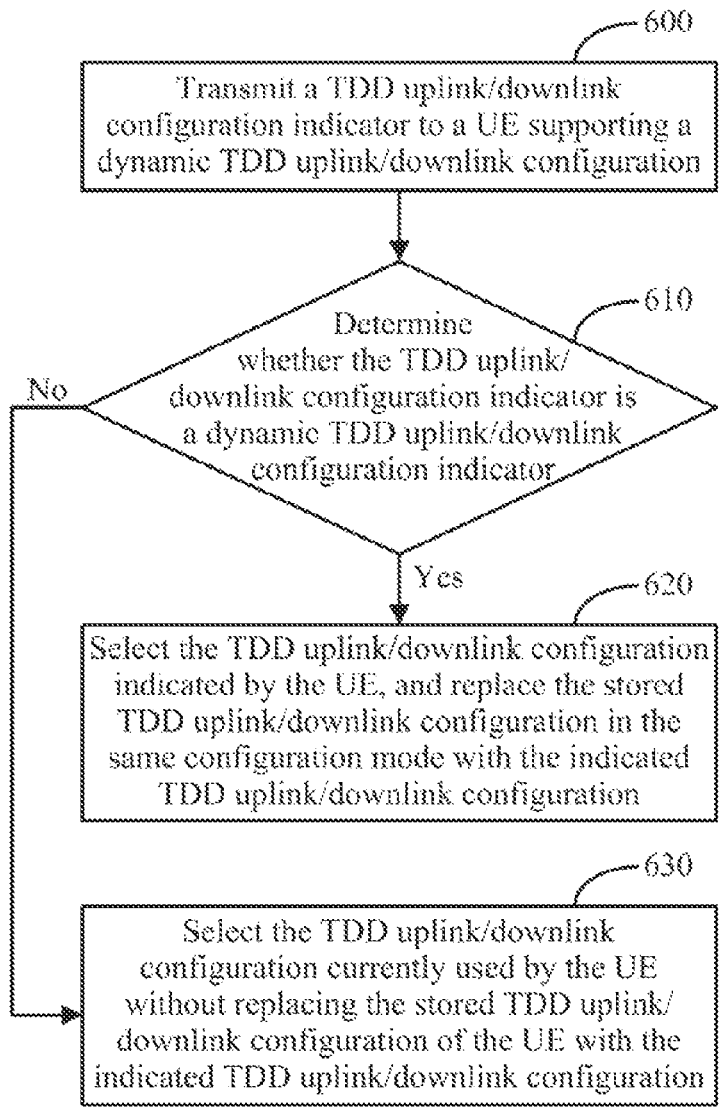
FIG. 7 illustrates a second flow chart of selecting and storing a TDD uplink/downlink configuration at the network side according to an embodiment of the invention.

Correspondingly the TDD uplink/downlink configuration is selected and stored in an implementation as illustrated in FIG. 7:

Step 600: A network-side device transmits a TDD uplink/downlink configuration indicator to a UE supporting a dynamic TDD uplink/downlink configuration;

Step 610: The network-side device determines whether the TDD uplink/downlink configuration indicator is a dynamic TDD uplink/downlink configuration indicator, and if so, then the network-side device proceeds to the step 620; otherwise, the network-side device proceeds to the step 630;

Step 620: The network-side device selects the TDD uplink/downlink configuration indicated by the UE, and replaces the stored TDD uplink/downlink configuration, which is in the same configuration mode as the indicated configuration, with the indicated TDD uplink/downlink configuration; and Step 630: The network-side device selects the TDD uplink/downlink configuration currently used by the UE without replacing the stored TDD uplink/downlink configuration of the UE with the indicated TDD uplink/downlink configuration.

If both a static or semi-static TDD uplink/downlink configuration indicator and a dynamic TDD uplink/downlink configuration indicator are transmitted, then correspondingly the network-side device can make the selection as follows:

The network-side device selects the TDD uplink/downlink configuration indicated by the dynamic TDD uplink/downlink configuration indicator.

The network side may store only one TDD uplink/downlink configuration of the UE, and correspondingly after transmitting the TDD uplink/downlink configuration indicator, the network-side device may replace the TDD uplink/downlink configuration of the UE stored by the network side with the TDD uplink/downlink configuration indicated by the dynamic TDD uplink/downlink configuration indicator. The stored TDD uplink/downlink configuration of the UE is the TDD uplink/downlink configuration currently used by the UE.

That is, after the TDD uplink/downlink configuration indicator is transmitted, the network-side device selects the TDD uplink/downlink configuration indicated by the dynamic TDD uplink/downlink configuration indicator, and replaces the stored TDD uplink/downlink configuration of the UE therewith.

The network side may alternatively store two TDD uplink/downlink configurations of the UE, and correspondingly the network side may replace the stored TDD uplink/downlink configuration of the UE, which is in the same configuration mode as the indicated dynamic configuration, with the TDD uplink/downlink configuration indicated by the dynamic TDD uplink/downlink configuration indicator, and replace the TDD uplink/downlink configuration of the UE stored by the network side, which is in the same configuration mode as the indicated static or semi-static configuration, with the TDD uplink/downlink configuration indicated by the static or semi-static TDD uplink/downlink configuration indicator. The TDD uplink/downlink configuration currently used by the UE is one of the TDD uplink/downlink configurations of the UE stored by the network side.

That is, after the TDD uplink/downlink configuration indicator is transmitted, the network-side device selects the indicated TDD uplink/downlink configuration indicated by the dynamic one of the TDD uplink/downlink configuration indicators, and replaces the stored TDD uplink/downlink configuration of the UE, which is in the same configuration mode as the selected dynamic configuration, with the selected dynamic configuration.

If both a static or semi-static TDD uplink/downlink configuration indicator and a dynamic TDD uplink/downlink configuration indicator are transmitted, then correspondingly the network-side device can alternatively make the selection as follows:

The network-side device selects the TDD uplink/downlink configuration indicated by the static or semi-static TDD uplink/downlink configuration indicator.

The network side may store only one TDD uplink/downlink configuration of the UE, and correspondingly the network-side device may replace the TDD uplink/downlink configuration of the UE stored by the network side with the TDD uplink/downlink configuration indicated by the static or semi-static TDD uplink/downlink configuration indicator after transmitting the TDD uplink/downlink configuration indicator. The stored TDD uplink/downlink configuration of the UE is the TDD uplink/downlink configuration currently used by the UE.

That is, after the TDD uplink/downlink configuration indicator is transmitted, the network-side device selects the TDD uplink/downlink configuration indicated by the static or semi-static TDD uplink/downlink configuration indicator, and replaces the stored TDD uplink/downlink configuration of the UE therewith.

The network side may alternatively store two TDD uplink/downlink configurations of the UE, and correspondingly the network side may replace the stored TDD uplink/downlink configuration of the UE in the same configuration mode with the TDD uplink/downlink configuration indicated by the dynamic TDD uplink/downlink configuration indicator, and replace the TDD uplink/downlink configuration of the UE stored by the network side in the same configuration mode with the TDD uplink/downlink configuration indicated by the static or semi-static TDD uplink/downlink configuration indicator, where the TDD uplink/downlink configuration currently used by the UE is one of the TDD uplink/downlink configurations of the UE stored by the network side.

That is, after the TDD uplink/downlink configuration indicator is transmitted, the network-side device selects the indicated TDD uplink/downlink configuration indicated by the dynamic one of the TDD uplink/downlink configuration indicators, and replaces the stored TDD uplink/downlink configuration of the UE in the same configuration mode therewith.

After the transmission directions of the subframes of the UE are determined in any one of the embodiments above of the method at the network-side device, such a situation may arise in which a transmission direction predetermined for a subframe is different from the transmission direction determined above, and in order to address the problem of data transmission in this situation, the following several data processing approaches will be listed in the embodiments of the invention:

First Data Processing Approach:

When data need to be transmitted, if a predetermined transmission direction, of a subframe carrying the data to be transmitted, predetermined for the UE is different from the transmission direction determined for the UE according to the selected TDD uplink/downlink configuration, then the network-side device stops the data to be transmitted from being transmitted in the subframe carrying the data to be transmitted.

Particularly if the network-side device configures the UE with uplink or downlink SPS, and a transmission direction of a subframe including a resource preconfigured for uplink or downlink SPS of the UE is changed, that is, uplink or downlink SPS data are transmitted in the subframe carrying the data to be transmitted, then the transmission direction predetermined for the subframe is different from the transmission direction according to the selected TDD uplink/downlink configuration, then the network-side device stops the uplink or downlink SPS data from being transmitted in the corresponding subframe.

Taking downlink SPS as an example, if a downlink SPS resource is configured at a periodicity of 20 ms, and the SPS resource is transmitted in the subframe #3 in an even-numbered radio frame, then once the TDD uplink/downlink configuration is changed so that the transmission direction of the subframe #3 in some even-numbered radio frame (e.g., with a System Frame Number (SFN)=6) is changed from the downlink to the uplink, so the current downlink SPS transmission is stopped in the subframe.

For the network-side device, stopping downlink SPS transmission refers to stopping the SPS resource from being transmitted in the corresponding subframe.

For uplink SPS transmission, stopping uplink SPS transmission refers to stopping the SPS resource from being received in the corresponding subframe.

Further to stopping uplink or downlink SPS transmission, the uplink or downlink SPS resource can be released or a next uplink or downlink SPS transmission occasion can be waited (e.g., in the subframe #3 with the SNF=8 in the scenario above).

Further to stopping uplink or downlink SPS transmission or releasing the uplink or downlink SPS resource, a downlink SPS traffic can be transmitted through dynamic scheduling in another subframe, or an uplink SPS traffic can be received in another subframe through dynamic scheduling, that is, the data to be transmitted by the SPS can be scheduled dynamically in a subframe of which the transmission direction in the selected TDD uplink/downlink configuration is the same as the transmission direction of the SPS.

The particular data processing approach in use can be prescribed between the network side and the UE side and or can be specified in a corresponding standard.

Particularly if a subframe for PUSCH initial transmission/synchronized adaptive retransmission/synchronized non-adaptive retransmission scheduled dynamically for the UE is changed from the uplink to the downlink, that is, a PUSCH is initially transmitted or retransmitted in the subframe carrying the data to be transmitted, and a transmission direction predetermined for the subframe is different from the transmission direction according to the selected TDD uplink/downlink configuration, then the network-side device stops the PUSCH transmission in the corresponding subframe.

Here stopping the PUSCH transmission particularly refers to stopping the PUSCH from being received.

Furthermore the UE releases an HARQ process corresponding to the PUSCH to be transmitted in the subframe, further to stopping the PUSCH transmission.

Particularly if a transmission direction of a subframe configured by the network-side device for the UE to carry a PUCCH and/or an SRS is changed from the uplink to the downlink because the TDD uplink/downlink configuration is changed, that is, an SRS and/or a PUCCH is transmitted in the subframe carrying the data to be transmitted, and a transmission direction predetermined for the subframe is different from the transmission direction determined according to the selected TDD uplink/downlink configuration, then the network-side device stops the SRS and/or the PUCCH transmission in the corresponding subframe.

Here stopping the SRS and/or the PUCCH transmission in the corresponding subframe refers to stopping the SRS and/or the PUCCH from being received.

Furthermore the network-side device instructs the RRC layer to release the SRS and/or the PUCCH configuration in addition to stopping the SRS and/or the PUCCH transmission.

Second Data Processing Approach

The network-side device releases the uplink or downlink SPS resource after determining that the UE supports a dynamic TDD uplink/downlink configuration and enables the dynamic TDD uplink/downlink configuration of the UE.

That is, if the dynamic TDD uplink/downlink configuration is enabled, then no SPS transmission is allowed.

Here the dynamic TDD uplink/downlink configuration can be decided to be enabled, by transmitting an instruction; or the dynamic TDD uplink/downlink configuration can be decided to be enabled after the TDD uplink/downlink configuration indicator is transmitted.

Furthermore after the dynamic TDD uplink/downlink configuration of the UE is disabled, the network-side device can schedule the UE using the SPS to transmit the uplink/downlink SPS data, either in a new SPS configuration by the network side or the previous SPS configuration.

Third Data Processing Approach

The network-side device obtains a predetermined transmission direction of a subframe carrying data to be transmitted, and selects the same TDD uplink/downlink configuration as the pre-determined transmission direction, where the selected TDD uplink/downlink configuration is the TDD uplink/downlink configuration indicated by the TDD uplink/downlink configuration indicator.

That is, if some subframe is configured with a Physical Random Access Channel (PRACH)/PUCCH/SRS, then the TDD uplink/downlink configuration shall be selected for the dynamic TDD uplink/downlink configuration while ensuring that a transmission direction of the subframe configured with a PRACH/PUCCH/SRS is unchanged.

Once the SPS is configured in some subframe, then a transmission direction of the subframe will not be changed.

Fourth Data Processing Approach

A subframe with a fixed transmission direction is determined, and uplink/downlink SPS, a PUCCH resource, and a PRACH and/or SRS resource are configured in the subframe with the fixed transmission direction.

That is, the PRACH/PUCCH/SRS is configured only in a UL subframe with a transmission direction which will not be changed.

SPS is configured only in a subframe with a transmission direction which will not be changed. By way of an example, if there are a set of subframes {#0, #1, #2, #5, #9} with transmission directions which will not be changed in a dynamic TDD uplink/downlink configuration of a cell, then uplink or downlink SPS will be configured only in the subframes in the set if the cell or the UE supports a dynamic TDD uplink/downlink configuration or enables a dynamic TDD configuration.

Here the subframes with the fixed transmission direction may be subframes with fixed transmission directions in the existing TDD uplink/downlink configurations 0 to 6 or may be subframes for which fixed transmission directions are specified.

For TTI bundling, the indicated TDD uplink/downlink configuration is the TDD uplink/downlink configuration 0 or 1 or 6 in the respective embodiments above.

Figure 8:
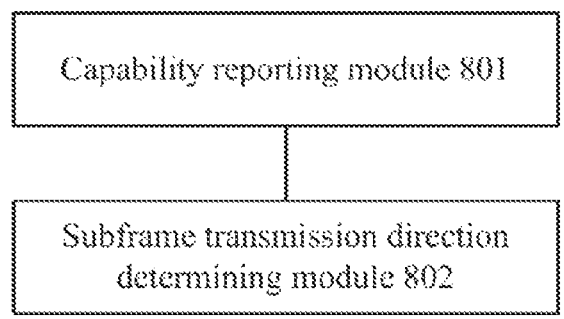
FIG. 8 illustrates a schematic structural diagram of a UE according to an embodiment of the invention.

Based upon the same inventive idea as the method, an embodiment of the invention provides a UE as illustrated in FIG. 8, which is embodied in the following structure:

A capability reporting module 801 is configured to report a capability indicator to a network-side device to indicate whether the UE supports a dynamic time division duplex uplink/downlink configuration; and A subframe transmission direction determining module 802 is configured, if the UE supports a dynamic time division duplex uplink/downlink configuration, to select one of an indicated time division duplex uplink/downlink configuration and a currently used time division duplex uplink/downlink configuration upon reception of a time division duplex uplink/downlink configuration indicator, and to determine transmission directions of respective subframes according to the selected time division duplex uplink/downlink configuration.

Reference can be made to the description of the embodiment of the method for particular implementations of the respective function modules in the UE according to the embodiment of the invention, so a repeated description thereof will be omitted here.

Further to the embodiment illustrated in FIG. 8, preferably the subframe transmission direction determining module 801 configured to select the one of the indicated time division duplex uplink/downlink configuration and the currently used time division duplex uplink/downlink configuration is configured:

To select the indicated time division duplex uplink/downlink configuration; and

The subframe transmission direction determining module 801 is further configured, upon reception of the time division duplex uplink/downlink configuration indicator:

To replace a time division duplex uplink/downlink configuration stored by the UE with the indicated time division duplex uplink/downlink configuration; or To search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration.

Further to the embodiment illustrated in FIG. 8, preferably the subframe transmission direction determining module 801 configured to select the one of the indicated time division duplex uplink/downlink configuration and the currently used time division duplex uplink/downlink configuration is configured:

To determine whether the time division duplex uplink/downlink configuration indicator is a dynamic time division duplex uplink/downlink configuration indicator, and if so, to select the indicated time division duplex uplink/downlink configuration; otherwise, to select the currently used time division duplex uplink/downlink configuration; and After determining whether the time division duplex uplink/downlink configuration indicator is a dynamic time division duplex uplink/downlink configuration indicator, the subframe transmission direction determining module 801 is further configured:

If the time division duplex uplink/downlink configuration indicator is a dynamic time division duplex uplink/downlink configuration indicator, to replace a time division duplex uplink/downlink configuration stored by the UE with the indicated time division duplex uplink/downlink configuration; or If the time division duplex uplink/downlink configuration indicator is a dynamic time division duplex uplink/downlink configuration indicator, to search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration.

Further to any one of the embodiments above of the UE, preferably if both a static or semi-static time division duplex uplink/downlink configuration indicator and a dynamic time division duplex uplink/downlink configuration indicator are received, then the subframe transmission direction determining module 801 configured to select the one of the indicated time division duplex uplink/downlink configuration and the currently used time division duplex uplink/downlink configuration is configured:

To select a time division duplex uplink/downlink configuration indicated by the dynamic time division duplex uplink/downlink configuration indicator; and The subframe transmission direction determining module 801 is configured, upon reception of the time division duplex uplink/downlink configuration indicators:

To replace a time division duplex uplink/downlink configuration stored by the UE with the time division duplex uplink/downlink configuration indicated by the dynamic time division duplex uplink/downlink configuration indicator; or To replace a time division duplex uplink/downlink configuration stored by the UE, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator; and to replace a time division duplex uplink/downlink configuration stored by the UE, which is in the same configuration mode as the time division duplex uplink/downlink configuration indicated by the static or semi-static time division duplex uplink/downlink configuration indicator, with a time division duplex uplink/downlink configuration indicated by the static or semi-static time division duplex uplink/downlink configuration indicator.

Further to any one of the embodiments above of the UE, preferably if both a static or semi-static time division duplex uplink/downlink configuration indicator and a dynamic time division duplex uplink/downlink configuration indicator are received, then the subframe transmission direction determining module 802 configured to select the one of the indicated time division duplex uplink/downlink configuration and the currently used time division duplex uplink/downlink configuration is configured:

To select a time division duplex uplink/downlink configuration indicated by the static or semi-static time division duplex uplink/downlink configuration indicator; and The subframe transmission direction determining module 802 is configured, upon reception of the time division duplex uplink/downlink configuration indicators:

To replace a time division duplex uplink/downlink configuration stored by the UE with the time division duplex uplink/downlink configuration indicated by the static or semi-static time division duplex uplink/downlink configuration indicator; or To replace a time division duplex uplink/downlink configuration stored by the UE, which is in the same configuration mode as the time division duplex uplink/downlink configuration indicated by the dynamic duplex uplink/downlink configuration indicator, with the time division duplex uplink/downlink configuration indicated by the dynamic duplex uplink/downlink configuration indicator; and to replace a time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the UE, in order to address the problem of the selected transmission direction of a subframe being different from a predetermined transmission direction thereof, the UE according to the embodiment of the invention can further transmit data in a particular implementation performed by any one of the following data processing modules:

If a predetermined transmission direction of a subframe carrying data to be transmitted is different from the transmission direction determined according to the selected time division duplex uplink/downlink configuration, then the UE can further include a first data processing module configured:

To stop the data to be transmitted from being transmitted in the subframe carrying the data to be transmitted.

Furthermore the first data processing module can be further configured:

If uplink or downlink semi-persistent scheduled data are transmitted in the subframe carrying the data to be transmitted, to release an uplink or downlink semi-persistent scheduling resource;

If a physical uplink shared channel is initially transmitted or retransmitted in the subframe carrying the data to be transmitted, to release a hybrid automatic repeat request process corresponding to a physical layer uplink shared channel to be transmitted in the subframe; and If a sounding reference signal and/or a physical uplink control channel is transmitted in the subframe carrying the data to be transmitted, to instruct a radio resource control protocol layer to release a sounding reference signal and/or a physical uplink control channel configuration.

Further to the data processing approach above, if the uplink or downlink semi-persistent scheduled data are stopped from being transmitted in the subframe carrying the data to be transmitted, then the UE can further include a second data processing module configured:

To receive dynamic scheduling of the data to be transmitted by semi-persistent scheduling, in a subframe of which the transmission direction in the selected time division duplex uplink/downlink configuration is the same as the transmission direction of the semi-persistent scheduling.

If the UE supports a dynamic time division duplex uplink/downlink configuration, and the dynamic time division duplex uplink/downlink configuration is enabled, then the UE can further includes a third data processing module configured:

To release an uplink or downlink semi-persistent scheduling resource.

Figure 9:
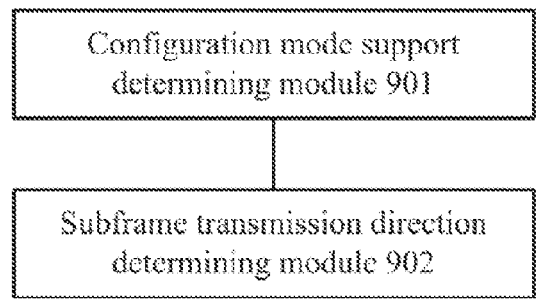
FIG. 9 illustrates a schematic structural diagram of a network-side device according to an embodiment of the invention.

Based upon the same inventive idea as the method, an embodiment of the invention further provides a network-side device structured as illustrated in FIG. 9, which is embodied in the following structure:

A configuration mode support determining module 901 is configured to determine whether a UE supports a dynamic time division duplex uplink/downlink configuration, according to a capability indicator reported by the UE; and A subframe transmission direction determining module 902 is configured, if the UE supports a dynamic time division duplex uplink/downlink configuration, after a time division duplex uplink/downlink configuration indicator is transmitted to the UE, to select one of an indicated time division duplex uplink/downlink configuration and a time division duplex uplink/downlink configuration currently used by the UE, and to determine transmission directions of respective subframes for the UE according to the selected time division duplex uplink/downlink configuration.

Reference can be made to the description of the embodiment of the method for particular implementations of the respective function modules in the network-side device according to the embodiment of the invention, so a repeated description thereof will be omitted here.

Further to the embodiment illustrated in FIG. 9, preferably the subframe transmission direction determining module 901 configured to select the one of the indicated time division duplex uplink/downlink configuration and the currently used time division duplex uplink/downlink configuration is configured:

To select the indicated time division duplex uplink/downlink configuration; and

The subframe transmission direction determining module 901 is further configured, after the time division duplex uplink/downlink configuration indicator is transmitted:

To replace a time division duplex uplink/downlink configuration of the UE stored by the network side with the indicated time division duplex uplink/downlink configuration; or To search for a time division duplex uplink/downlink configuration of the UE stored by the network side in the same configuration mode as the indicated time division duplex uplink/downlink configuration, and to replace the stored time division duplex uplink/downlink configuration of the UE with the indicated time division duplex uplink/downlink configuration.

Further to the embodiment illustrated in FIG. 9, preferably the subframe transmission direction determining module 901 configured to select the one of the indicated time division duplex uplink/downlink configuration and the currently used time division duplex uplink/downlink configuration is configured:

To determine whether the time division duplex uplink/downlink configuration indicator is a dynamic time division duplex uplink/downlink configuration indicator, and if so, to select the indicated time division duplex uplink/downlink configuration; otherwise, to select the currently used time division duplex uplink/downlink configuration; and After determining whether the time division duplex uplink/downlink configuration indicator is a dynamic time division duplex uplink/downlink configuration indicator, the subframe transmission direction determining module 901 is further configured:

If the time division duplex uplink/downlink configuration indicator is a dynamic time division duplex uplink/downlink configuration indicator, to replace a time division duplex uplink/downlink configuration of the UE stored by the network side with the indicated time division duplex uplink/downlink configuration; or If the time division duplex uplink/downlink configuration indicator is a dynamic time division duplex uplink/downlink configuration indicator, to search for a time division duplex uplink/downlink configuration of the UE stored by the network side in the same configuration mode as the indicated time division duplex uplink/downlink configuration, and to replace the stored time division duplex uplink/downlink configuration with the indicated time division duplex uplink/downlink configuration.

Further to any one of the embodiments above of the network-side device, preferably if both a static or semi-static time division duplex uplink/downlink configuration indicator and a dynamic time division duplex uplink/downlink configuration indicator are transmitted, then the subframe transmission direction determining module 901 configured to select the one of the indicated time division duplex uplink/downlink configuration and the currently used time division duplex uplink/downlink configuration is configured:

To select a time division duplex uplink/downlink configuration indicated by the dynamic time division duplex uplink/downlink configuration indicator; and The subframe transmission direction determining module 901 is configured, after the time division duplex uplink/downlink configuration indicators are transmitted:

To replace a time division duplex uplink/downlink configuration of the UE stored by the network side with the time division duplex uplink/downlink configuration indicated by the dynamic time division duplex uplink/downlink configuration indicator, or To replace a time division duplex uplink/downlink configuration of the UE stored by the network side, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator; and to replace a time division duplex uplink/downlink configuration of the UE stored by the network side, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the network-side device, preferably if both a static or semi-static time division duplex uplink/downlink configuration indicator and a dynamic time division duplex uplink/downlink configuration indicator are transmitted, then the subframe transmission direction determining module 901 configured to select the one of the indicated time division duplex uplink/downlink configuration and the currently used time division duplex uplink/downlink configuration is configured:

To select a time division duplex uplink/downlink configuration indicated by the static or semi-static time division duplex uplink/downlink configuration indicator; and The subframe transmission direction determining module 901 is configured, after the time division duplex uplink/downlink configuration indicators are transmitted:

To replace a time division duplex uplink/downlink configuration of the UE stored by the network side with the time division duplex uplink/downlink configuration indicated by the static or semi-static time division duplex uplink/downlink configuration indicator; or To replace a time division duplex uplink/downlink configuration of the UE stored by the network side, which is in the same configuration mode as the time division duplex uplink/downlink configuration indicated by the dynamic duplex uplink/downlink configuration indicator, with the time division duplex uplink/downlink configuration indicated by the dynamic duplex uplink/downlink configuration indicator; and to replace a time division duplex uplink/downlink configuration of the UE stored by the network side, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the network-side device, preferably the subframe transmission direction determining module 901 is further configured:

To determine whether the indicated time division duplex uplink/downlink configuration is a dynamic time division duplex uplink/downlink configuration after the time division duplex uplink/downlink configuration indicator is transmitted: and If so, to determine the transmission directions of the respective subframes for the UE according to the currently used time division duplex uplink/downlink configuration;

Otherwise, to determine the transmission directions of the respective subframes for the UE according to the indicated time division duplex uplink/downlink configuration, and to replace the currently used time division duplex uplink/downlink configuration with the indicated time division duplex uplink/downlink configuration.

Further to any one of the embodiments above of the network-side device, in order to address the problem of the selected transmission direction of a subframe being different from a predetermined transmission direction thereof, the network-side device according to the embodiment of the invention can further transmit data in a particular implementation performed by any one of the following data processing modules:

If a transmission direction, of a subframe carrying data to be transmitted, predetermined for the UE is different from the transmission direction determined for the UE according to the selected time division duplex uplink/downlink configuration, then the network-side device can further include a fourth data processing module configured:

To stop the data to be transmitted from being transmitted in the subframe carrying the data to be transmitted.

Furthermore the fourth data processing module can be further configured:

If uplink or downlink semi-persistent scheduled data are transmitted in the subframe carrying the data to be transmitted, to release an uplink or downlink semi-persistent scheduling resource;

If a physical uplink shared channel is initially transmitted or retransmitted in the subframe carrying the data to be transmitted, to release a hybrid automatic repeat request process corresponding to a physical layer uplink shared channel to be transmitted in the subframe; and If a sounding reference signal and/or a physical uplink control channel is transmitted in the subframe carrying the data to be transmitted, to instruct a radio resource control protocol layer to release a sounding reference signal and/or a physical uplink control channel configuration.

Further to the data processing approach above, if the uplink or downlink semi-persistent scheduled data are stopped from being transmitted in the subframe carrying the data to be transmitted, then the network-side device can further include a fifth data processing module configured:

To schedule dynamically the data which originally needs to be transmitted by the semi-persistent scheduling, in a subframe of which the transmission direction in the selected time division duplex uplink/downlink configuration is the same as the transmission direction of the semi-persistent scheduling.

If the UE is determined to support a dynamic time division duplex uplink/downlink configuration, and the dynamic time division duplex uplink/downlink configuration is enabled, then the network-side device can further include a sixth data processing module configured:

To release an uplink or downlink semi-persistent scheduling resource.

The network-side device can further include a seventh data processing module configured:

To obtain a predetermined transmission direction of a subframe carrying data to be transmitted; and To select the time division duplex uplink/downlink configuration in which the transmission direction of the subframe is the same as the pre-determined transmission direction of the subframe, thus the selected time division duplex uplink/downlink configuration is the time division duplex uplink/downlink configuration indicated by the time division duplex uplink/downlink configuration indicator.

The network side can further include an eighth data processing module configured:

To determine a subframe with a fixed transmission direction; and

To configure uplink/downlink semi-persistent scheduling, a Physical Uplink Control Channel (PUCCH) resource, a Physical Random Access Channel (PRACH) resource and/or a Sounding Reference Signal (SRS) resource in the subframe with the fixed transmission direction.

The network-side device according to the embodiment of the invention can be but will not be limited to an eNB.

Figure 10:
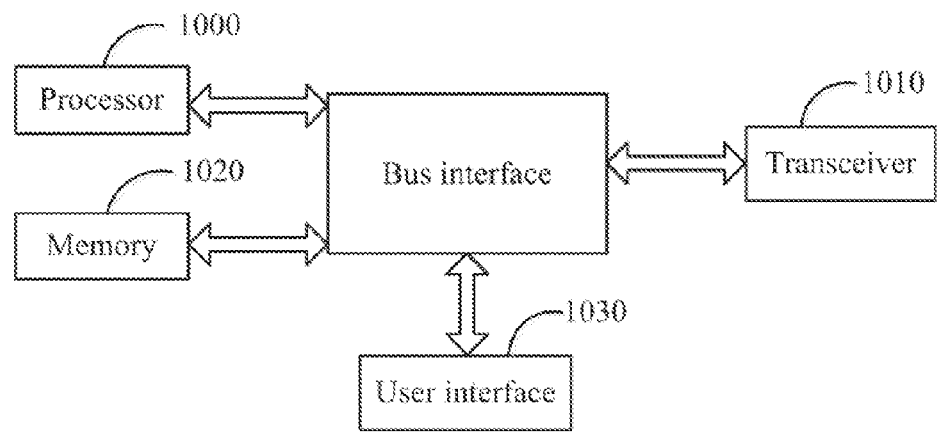
FIG. 10 illustrates a schematic structural diagram of another UE according to an embodiment of the invention.

Based upon the same inventive idea as the method, an embodiment of the invention further provides another UE structured as illustrated in FIG. 10, which is embodied in the following structure:

A processor 1000 is configured to report a capability indicator to a network-side device through a transceiver 1010 to indicate whether the UE supports a dynamic time division duplex uplink/downlink configuration; and if the UE supports a dynamic time division duplex uplink/downlink configuration, to select one of an indicated time division duplex uplink/downlink configuration and a currently used time division duplex uplink/downlink configuration upon reception of a time division duplex uplink/downlink configuration indicator, and to determine transmission directions of respective subframes according to the selected time division duplex uplink/downlink configuration; and The transceiver 1010 is configured to receive and transmit data under the control of the processor 1000.

Reference can be made to the description of the embodiment of the method for particular implementations of the respective function modules in the UE according to the embodiment of the invention, so a repeated description thereof will be omitted here.

Further to the embodiment illustrated in FIG. 10, preferably the processor 1000 configured to select the one of the indicated time division duplex uplink/downlink configuration and the currently used time division duplex uplink/downlink configuration is configured:

To select the indicated time division duplex uplink/downlink configuration; and

The processor 1000 is further configured, upon reception of the time division duplex uplink/downlink configuration indicator:

To replace a time division duplex uplink/downlink configuration stored by the UE with the indicated time division duplex uplink/downlink configuration; or To search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration.

Further to the embodiment illustrated in FIG. 10, preferably the processor 1000 configured to select the one of the indicated time division duplex uplink/downlink configuration and the currently used time division duplex uplink/downlink configuration is configured:

To determine whether the time division duplex uplink/downlink configuration indicator is a dynamic time division duplex uplink/downlink configuration indicator, and if so, to select the indicated time division duplex uplink/downlink configuration; otherwise, to select the currently used time division duplex uplink/downlink configuration; and After determining whether the time division duplex uplink/downlink configuration indicator is a dynamic time division duplex uplink/downlink configuration indicator, the processor 1000 is further configured:

If the time division duplex uplink/downlink configuration indicator is a dynamic time division duplex uplink/downlink configuration indicator, to replace a time division duplex uplink/downlink configuration stored by the UE with the indicated time division duplex uplink/downlink configuration; or If the time division duplex uplink/downlink configuration indicator is a dynamic time division duplex uplink/downlink configuration indicator, to search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration.

Further to any one of the embodiments above of the UE, preferably if both a static or semi-static time division duplex uplink/downlink configuration indicator and a dynamic time division duplex uplink/downlink configuration indicator are received, then the processor 1000 configured to select the one of the indicated time division duplex uplink/downlink configuration and the currently used time division duplex uplink/downlink configuration is configured:

To select a time division duplex uplink/downlink configuration indicated by the dynamic time division duplex uplink/downlink configuration indicator, and The processor 1000 is configured, upon reception of the time division duplex uplink/downlink configuration indicators:

To replace a time division duplex uplink/downlink configuration stored by the UE with the time division duplex uplink/downlink configuration indicated by the dynamic time division duplex uplink/downlink configuration indicator; or To replace a time division duplex uplink/downlink configuration stored by the UE, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator; and to replace a time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the UE, preferably if both a static or semi-static time division duplex uplink/downlink configuration indicator and a dynamic time division duplex uplink/downlink configuration indicator are received, then the processor 1000 configured to select the one of the indicated time division duplex uplink/downlink configuration and the currently used time division duplex uplink/downlink configuration is configured:

To select a time division duplex uplink/downlink configuration indicated by the static or semi-static time division duplex uplink/downlink configuration indicator; and The processor 1000 is configured, upon reception of the time division duplex uplink/downlink configuration indicators:

To replace a time division duplex uplink/downlink configuration stored by the UE with the time division duplex uplink/downlink configuration indicated by the static or semi-static time division duplex uplink/downlink configuration indicator; or To replace a time division duplex uplink/downlink configuration stored by the UE, which is in the same configuration mode as the time division duplex uplink/downlink configuration indicated by the dynamic duplex uplink/downlink configuration indicator, with the time division duplex uplink/downlink configuration indicated by the dynamic duplex uplink/downlink configuration indicator, and to replace a time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the UE, in order to address the problem of the selected transmission direction of a subframe being different from a predetermined transmission direction thereof, the UE according to the embodiment of the invention can further transmit data in a particular implementation as follows:

If a predetermined transmission direction of a subframe carrying data to be transmitted is different from the transmission direction determined according to the selected time division duplex uplink/downlink configuration, then the processor 1000 is further configured:

To stop the data to be transmitted from being transmitted in the subframe carrying the data to be transmitted.

Furthermore the processor 1000 is further configured:

If uplink or downlink semi-persistent scheduled data are transmitted in the subframe carrying the data to be transmitted, to release an uplink or downlink semi-persistent scheduling resource;

If a physical uplink shared channel is initially transmitted or retransmitted in the subframe carrying the data to be transmitted, to release a hybrid automatic repeat request process corresponding to a physical layer uplink shared channel to be transmitted in the subframe; and If a sounding reference signal and/or a physical uplink control channel is transmitted in the subframe carrying the data to be transmitted, to instruct a radio resource control protocol layer to release a sounding reference signal and/or a physical uplink control channel configuration.

Further to the data processing approach above, if the uplink or downlink semi-persistent scheduled data are stopped from being transmitted in the subframe carrying the data to be transmitted, then the processor 1000 is further configured:

To receive dynamic scheduling of the data to be transmitted by semi-persistent scheduling, in a subframe of which the transmission direction in the selected time division duplex uplink/downlink configuration is the same as the transmission direction of the semi-persistent scheduling.

If the UE supports a dynamic time division duplex uplink/downlink configuration, and the dynamic time division duplex uplink/downlink configuration is enabled, then the processor 1000 is further configured:

To release an uplink or downlink semi-persistent scheduling resource.

Here in FIG. 10, a bus architecture can include any number of interconnection buses and bridges which are particularly configured to link various circuits including the processor 1000 and a memory. The bus architecture can link various other circuits together, e.g., peripheral devices, a manostat, a power management circuit, etc., all of which are well known in the art, so a repeated description thereof will be omitted here. A bus interface provides an interface. The transceiver 1010 can include a plurality of elements including a transmitter and a receiver configured to provide elements communicating with other various apparatuses over a transmission medium. For a different user equipment, a user interface 1030 can also be an interface capable of connecting a required device externally or internally, where the connected device can include but will not be limited to a keypad, a display, a speaker, a microphone, a joy stick, etc.

The processor 1000 is responsible of managing the bus architecture and of normal processes, and the memory 1020 can store data used by the processor 1000 in operation.

Figure 11:
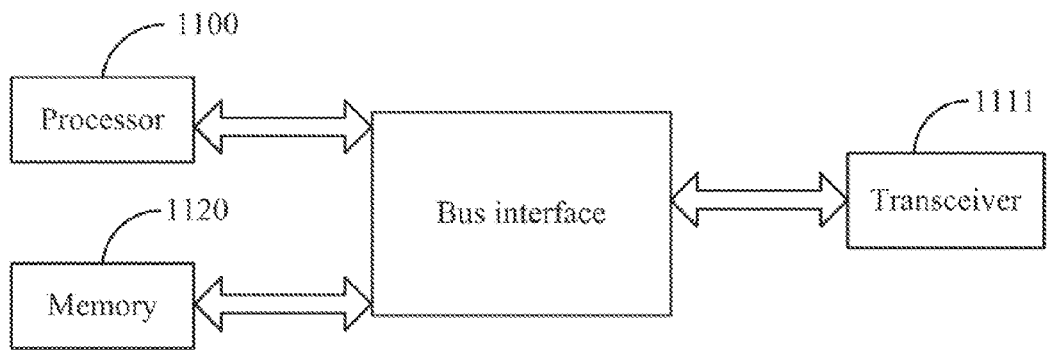
FIG. 11 illustrates a schematic structural diagram of another network-side device according to an embodiment of the invention.

Based upon the same inventive idea as the method, an embodiment of the invention further provides a network-side device structured as illustrated in FIG. 11, which is embodied in the following structure:

A processor 1100 is configured to determine whether a UE supports a dynamic time division duplex uplink/downlink configuration, according to a capability indicator reported by the UE; and if the UE supports a dynamic time division duplex uplink/downlink configuration, after a time division duplex uplink/downlink configuration indicator is transmitted to the UE through a transceiver 1100, to select one of an indicated time division duplex uplink/downlink configuration and a time division duplex uplink/downlink configuration currently used by the UE, and to determine transmission directions of respective subframes for the UE according to the selected time division duplex uplink/downlink configuration; and The transceiver 1110 is configured to transmit and receive data under the control of the processor 1100.

Reference can be made to the description of the embodiment of the method for particular implementations of the respective function modules in the network-side device according to the embodiment of the invention, so a repeated description thereof will be omitted here.

Further to the embodiment illustrated in FIG. 11, preferably the processor 1100 configured to select the one of the indicated time division duplex uplink/downlink configuration and the currently used time division duplex uplink/downlink configuration is configured:

To select the indicated time division duplex uplink/downlink configuration; and

The processor 1100 is further configured, after the time division duplex uplink/downlink configuration indicator is transmitted:

To replace a time division duplex uplink/downlink configuration of the UE stored by the network side with the indicated time division duplex uplink/downlink configuration; or To search for a time division duplex uplink/downlink configuration of the UE stored by the network side in the same configuration mode as the indicated time division duplex uplink/downlink configuration, and to replace the stored time division duplex uplink/downlink configuration of the UE with the indicated time division duplex uplink/downlink configuration.

Further to the embodiment illustrated in FIG. 11, preferably the processor 1100 configured to select the one of the indicated time division duplex uplink/downlink configuration and the currently used time division duplex uplink/downlink configuration is configured:

To determine whether the time division duplex uplink/downlink configuration indicator is a dynamic time division duplex uplink/downlink configuration indicator, and if so, to select the indicated time division duplex uplink/downlink configuration: otherwise, to select the time division duplex uplink/downlink configuration currently used by the UE; and After determining whether the time division duplex uplink/downlink configuration indicator is a dynamic time division duplex uplink/downlink configuration indicator, the processor 1100 is further configured:

If the time division duplex uplink/downlink configuration indicator is a dynamic time division duplex uplink/downlink configuration indicator, to replace a time division duplex uplink/downlink configuration of the UE stored by the network side with the indicated time division duplex uplink/downlink configuration; or If the time division duplex uplink/downlink configuration indicator is a dynamic time division duplex uplink/downlink configuration indicator, to search for a time division duplex uplink/downlink configuration of the UE stored by the network side in the same configuration mode as the indicated time division duplex uplink/downlink configuration, and to replace the stored time division duplex uplink/downlink configuration with the indicated time division duplex uplink/downlink configuration.

Further to any one of the embodiments above of the network-side device, preferably if both a static or semi-static time division duplex uplink/downlink configuration indicator and a dynamic time division duplex uplink/downlink configuration indicator are transmitted, then the processor 1100 configured to select the one of the indicated time division duplex uplink/downlink configuration and the currently used time division duplex uplink/downlink configuration is configured:

To select a time division duplex uplink/downlink configuration indicated by the dynamic time division duplex uplink/downlink configuration indicator; and The processor 1100 is configured, after the time division duplex uplink/downlink configuration indicators are transmitted:

To replace a time division duplex uplink/downlink configuration of the UE stored by the network side with the time division duplex uplink/downlink configuration indicated by the dynamic time division duplex uplink/downlink configuration indicator, or To replace a time division duplex uplink/downlink configuration of the UE stored by the network side, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator: and to replace a time division duplex uplink/downlink configuration of the UE stored by the network side, which is in the same configuration mode as the time division duplex uplink/downlink configuration indicated by the dynamic time division duplex uplink/downlink configuration indicator, with the time division duplex uplink/downlink configuration indicated by the static or semi-static time division duplex uplink/downlink configuration indicator.

Further to any one of the embodiments above of the network-side device, preferably if both a static or semi-static time division duplex uplink/downlink configuration indicator and a dynamic time division duplex uplink/downlink configuration indicator are transmitted, then the processor 1100 configured to select the one of the indicated time division duplex uplink/downlink configuration and the currently used time division duplex uplink/downlink configuration is configured:

To select a time division duplex uplink/downlink configuration indicated by the static or semi-static time division duplex uplink/downlink configuration indicator; and The processor 1100 is configured, after the time division duplex uplink/downlink configuration indicators are transmitted:

To replace a time division duplex uplink/downlink configuration of the UE stored by the network side with the time division duplex uplink/downlink configuration indicated by the static or semi-static time division duplex uplink/downlink configuration indicator; or To replace a time division duplex uplink/downlink configuration of the UE stored by the network side, which is in the same configuration mode as the time division duplex uplink/downlink configuration indicated by the dynamic duplex uplink/downlink configuration indicator, with the time division duplex uplink/downlink configuration indicated by the dynamic duplex uplink/downlink configuration indicator; and to replace a time division duplex uplink/downlink configuration of the UE stored by the network side, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

Further to any one of the embodiments above of the network-side device, preferably the processor 1100 is further configured:

To determine whether the indicated time division duplex uplink/downlink configuration is a dynamic time division duplex uplink/downlink configuration after the time division duplex uplink/downlink configuration indicator is transmitted; and If so, to determine the transmission directions of the respective subframes for the UE according to the currently used time division duplex uplink/downlink configuration:

Otherwise, to determine the transmission directions of the respective subframes for the UE according to the indicated time division duplex uplink/downlink configuration, and to replace the currently used time division duplex uplink/downlink configuration with the indicated time division duplex uplink/downlink configuration.

Further to any one of the embodiments above of the network-side device, in order to address the problem of the selected transmission direction of a subframe being different from a predetermined transmission direction thereof, the network-side device according to the embodiment of the invention can further transmit data in a particular implementation as follows:

If a transmission direction, of a subframe carrying data to be transmitted, predetermined for the UE is different from the transmission direction determined for the UE according to the selected time division duplex uplink/downlink configuration, then the processor 1100 is further configured:

To stop the data to be transmitted from being transmitted in the subframe carrying the data to be transmitted.

Furthermore the processor 1100 is further configured:

If uplink or downlink semi-persistent scheduled data are transmitted in the subframe carrying the data to be transmitted, to release an uplink or downlink semi-persistent scheduling resource;

If a physical uplink shared channel is initially transmitted or retransmitted in the subframe carrying the data to be transmitted, to release a hybrid automatic repeat request process corresponding to a physical layer uplink shared channel to be transmitted in the subframe; and If a sounding reference signal and/or a physical uplink control channel is transmitted in the subframe carrying the data to be transmitted, to instruct a radio resource control protocol layer to release a sounding reference signal and/or a physical uplink control channel configuration.

Further to the data processing approach above, if the uplink or downlink semi-persistent scheduled data are stopped from being transmitted in the subframe carrying the data to be transmitted, then the processor 1100 is further configured:

To schedule dynamically the data which originally needs to be transmitted by the semi-persistent scheduling, in a subframe of which the transmission direction in the selected time division duplex uplink/downlink configuration is the same as the transmission direction of the semi-persistent scheduling.

If the UE is determined to support a dynamic time division duplex uplink/downlink configuration, and the dynamic time division duplex uplink/downlink configuration is enabled, then the processor 1100 is further configured:

To release an uplink or downlink semi-persistent scheduling resource.

The processor 1100 is further configured:

To obtain a predetermined transmission direction of a subframe carrying data to be transmitted; and To select the time division duplex uplink/downlink configuration in which the transmission direction of the subframe is the same as the pre-determined transmission direction of the subframe, thus the selected time division duplex uplink/downlink configuration is the time division duplex uplink/downlink configuration indicated by the time division duplex uplink/downlink configuration indicator.

The processor 1100 is further configured:

To determine a subframe with a fixed transmission direction; and

To configure uplink/downlink semi-persistent scheduling, a Physical Uplink Control Channel (PUCCH) resource, a Physical Random Access Channel (PRACH) resource and/or a Sounding Reference Signal (SRS) resource in the subframe with the fixed transmission direction.

Here in FIG. 11, a bus architecture can include any number of interconnection buses and bridges which are particularly configured to link various circuits including the processor 1100 and a memory. The bus architecture can link various other circuits together, e.g., peripheral devices, a manostat, a power management circuit, etc., all of which are well known in the art, so a repeated description thereof will be omitted here. A bus interface provides an interface. The transceiver 1110 can include a plurality of elements including a transmitter and a receiver configured to provide elements communicating with other various apparatuses over a transmission medium. The processor 1100 is responsible of managing the bus architecture and of normal processes, and the memory 1120 can store data used by the processor 1100 in operation.

The processor 1100 is responsible of managing the bus architecture and of normal processes, and the memory 1120 can store data used by the processor 1100 in operation.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A communication processing method, the method comprising:
   reporting, by a UE, a capability indicator to a network-side device to indicate whether the UE supports a dynamic time division duplex uplink/downlink configuration; and
   if the UE supports a dynamic time division duplex uplink/downlink configuration, then selecting, by the UE, one of an indicated time division duplex uplink/downlink configuration and a currently used time division duplex uplink/downlink configuration upon reception of a time division duplex uplink/downlink configuration indicator, and determining a transmission direction of each subframe according to the selected time division duplex uplink/downlink configuration;
   wherein if a predetermined transmission direction of a subframe carrying data to be transmitted is different from the transmission direction determined according to the selected time division duplex uplink/downlink configuration, the method further comprises:
   stopping, by the UE, the data to be transmitted from being transmitted in the subframe carrying the data to be transmitted;
   wherein if uplink or downlink semi-persistent scheduled data is transmitted in the subframe carrying the data to be transmitted, then the method further comprises: releasing, by the UE, an uplink or downlink semi-persistent scheduling resource;
   if a physical uplink shared channel is initially transmitted or retransmitted in the subframe carrying the data to be transmitted, then the method further comprises: releasing, by the UE, a hybrid automatic repeat request process corresponding to a physical layer uplink shared channel to be transmitted in the subframe; and
   if a sounding reference signal and/or a physical uplink control channel is transmitted in the subframe carrying the data to be transmitted, then the method further comprises: instructing, by the UE, a radio resource control protocol layer to release a sounding reference signal and/or a physical uplink control channel configuration;
   wherein when the uplink or downlink semi-persistent scheduled data is stopped from being transmitted in the subframe carrying the data to be transmitted, then the method further comprises:
   receiving, by the UE, dynamic scheduling of the uplink or downlink semi-persistent scheduled data, in a subframe of which the transmission direction in the selected time division duplex uplink/downlink configuration is the same as a transmission direction of the uplink or downlink semi-persistent scheduled data.

2. The method according to claim 1, wherein selecting, by the UE, the one of the indicated time division duplex uplink/downlink configuration and the currently used time division duplex uplink/downlink configuration comprises:
   selecting, by the UE, the indicated time division duplex uplink/downlink configuration; and
   after the UE receives the time division duplex uplink/downlink configuration indicator, the method further comprises:
   replacing, by the UE, a time division duplex uplink/downlink configuration stored by the UE with the indicated time division duplex uplink/downlink configuration; or
   searching, by the UE, for a time division duplex uplink/downlink configuration stored by the UE in the same configuration mode as the indicated time division duplex uplink/downlink configuration, and replacing the stored time division duplex uplink/downlink configuration with the indicated time division duplex uplink/downlink configuration;
   or
   wherein selecting, by the UE, the one of the indicated time division duplex uplink/downlink configuration and the currently used time division duplex uplink/downlink configuration comprises:
   determining, by the UE, whether the time division duplex uplink/downlink configuration indicator is a dynamic time division duplex uplink/downlink configuration indicator, and if so, then selecting the indicated time division duplex uplink/downlink configuration; otherwise, selecting the currently used time division duplex uplink/downlink configuration; and
   after the UE determines whether the time division duplex uplink/downlink configuration indicator is a dynamic time division duplex uplink/downlink configuration indicator, the method further comprises:
   if the time division duplex uplink/downlink configuration indicator is a dynamic time division duplex uplink/downlink configuration indicator, then replacing, by the UE, a time division duplex uplink/downlink configuration stored by the UE with the indicated time division duplex uplink/downlink configuration; or searching, by the UE, for a time division duplex uplink/downlink configuration stored by the UE in the same configuration mode as the indicated time division duplex uplink/downlink configuration, and replacing the stored time division duplex uplink/downlink configuration with the indicated time division duplex uplink/downlink configuration.

3. The method according to claim 1, wherein if both a static or semi-static time division duplex uplink/downlink configuration indicator and a dynamic time division duplex uplink/downlink configuration indicator are received, then selecting, by the UE, the one of the indicated time division duplex uplink/downlink configuration and the currently used time division duplex uplink/downlink configuration comprises:
   selecting, by the UE, a time division duplex uplink/downlink configuration indicated by the dynamic time division duplex uplink/downlink configuration indicator; and after the UE receives the time division duplex uplink/ downlink configuration indicators, the method further comprises:
replacing, by the UE, a time division duplex uplink/ downlink configuration stored by the UE with the time division duplex uplink/downlink configuration indicated by the dynamic time division duplex uplink/ downlink configuration indicator; or
replacing, by the UE, a time division duplex uplink/ downlink configuration stored by the UE, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator, and replacing the time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator; or
wherein if both a static or semi-static time division duplex uplink/downlink configuration indicator and a dynamic time division duplex uplink/downlink configuration indicator are received, then selecting, by the UE, the one of the indicated time division duplex uplink/downlink configuration and the currently used time division duplex uplink/downlink configuration comprises:
selecting, by the UE, a time division duplex uplink/ downlink configuration indicated by the static or semi-static time division duplex uplink/downlink configuration indicator; and
after the UE receives the time division duplex uplink/ downlink configuration indicators, the method further comprises:
replacing, by the UE, a time division duplex uplink/ downlink configuration stored by the UE with the time division duplex uplink/downlink configuration indicated by the static or semi-static time division duplex uplink/downlink configuration indicator; or
replacing, by the UE, a time division duplex uplink/ downlink configuration stored by the UE, which is in the same configuration mode as a time division duplex uplink/downlink configuration indicated by the dynamic time division duplex uplink/downlink configuration indicator, with the time division duplex uplink/downlink configuration indicated by the dynamic time division duplex uplink/downlink configuration indicator, and replacing the time division duplex uplink/downlink configuration stored by the UE, which is in the same configuration mode as a time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

4. The method according to claim 1, wherein if the UE supports a dynamic time division duplex uplink/downlink configuration, and the dynamic time division duplex uplink/ downlink configuration is enabled, then the method further comprises:

releasing, by the UE, an uplink or downlink semi-persistent scheduling resource;
wherein after the dynamic time division duplex uplink/ downlink configuration is disabled, the method further comprises:
transmitting uplink/downlink semi-persistent scheduled data using semi-persistent scheduling.

5. The method according to claim 1, wherein for the transmission with transmission time interval bundling, the indicated time division duplex uplink/downlink configuration is the time division duplex uplink/downlink configuration 0 or 1 or 6.

6. A communication processing method, the method comprising:
determining, by a network-side device, whether a UE supports a dynamic time division duplex uplink/downlink configuration, according to a capability indicator reported by the UE; and
if the UE supports a dynamic time division duplex uplink/ downlink configuration, then after transmitting a time division duplex uplink/downlink configuration indicator to the UE, selecting, by the network-side device, one of an indicated time division duplex uplink/downlink configuration and a time division duplex uplink/ downlink configuration currently used by the UE, and determining a transmission direction of each subframe for the UE according to the selected time division duplex uplink/downlink configuration;
wherein if a transmission direction, of a subframe carrying data to be transmitted, predetermined for the UE is different from the transmission direction determined for the UE according to the selected time division duplex uplink/downlink configuration, then the method further comprises:
stopping, by the network-side device, the data to be transmitted from being transmitted in the subframe carrying the data to be transmitted;
wherein if uplink or downlink semi-persistent scheduled data is transmitted in the subframe carrying the data to be transmitted, then the method comprises: releasing, by the network-side device, an uplink or downlink semi-persistent scheduling resource;
if a physical uplink shared channel is initially transmitted or retransmitted in the subframe carrying the data to be transmitted, then the method comprises: releasing, by the network-side device, a hybrid automatic repeat request process corresponding to a physical layer uplink shared channel to be transmitted in the subframe; and
if a sounding reference signal and/or a physical uplink control channel is transmitted in the subframe carrying the data to be transmitted, then the method comprises: instructing, by the network-side device, a radio resource control protocol layer to release a sounding reference signal and/or a physical uplink control channel configuration;
wherein when the uplink or downlink semi-persistent scheduled data is stopped from being transmitted in the subframe carrying the data to be transmitted, then the method comprises:
scheduling dynamically, by the network-side device, the uplink or downlink semi-persistent scheduled data, in a subframe of which the transmission direction in the selected time division duplex uplink/downlink configuration is the same as a transmission direction of the uplink or downlink semi-persistent scheduled data.

7. The method according to claim 6, wherein selecting, by the network-side device, the one of the indicated time division duplex uplink/downlink configuration and the time division duplex uplink/downlink configuration currently used by the UE comprises:
   selecting, by the network-side device, the indicated time division duplex uplink/downlink configuration; and
   after the network-side device transmits the time division duplex uplink/downlink configuration indicator, the method further comprises:
   replacing, by the network-side device, a time division duplex uplink/downlink configuration of the UE stored by the network side with the indicated time division duplex uplink/downlink configuration; or
   searching, by the network-side device, for a time division duplex uplink/downlink configuration of the UE stored by the network side in the same configuration mode as the indicated time division duplex uplink/downlink configuration, and replacing the stored time division duplex uplink/downlink configuration of the UE with the indicated time division duplex uplink/downlink configuration;
   wherein selecting, by the network-side device, the one of the indicated time division duplex uplink/downlink configuration and the time division duplex uplink/downlink configuration currently used by the UE comprises:
   determining, by the network-side device, whether the time division duplex uplink/downlink configuration indicator is a dynamic time division duplex uplink/downlink configuration indicator, and if so, then selecting the indicated time division duplex uplink/downlink configuration; otherwise, selecting the time division duplex uplink/downlink configuration currently used by the UE; and
   after determining whether the time division duplex uplink/downlink configuration indicator is a dynamic time division duplex uplink/downlink configuration indicator, the method further comprises:
   if the time division duplex uplink/downlink configuration indicator is a dynamic time division duplex uplink/downlink configuration indicator, then replacing, by the network-side device, a time division duplex uplink/downlink configuration of the UE stored by the network side with the indicated time division duplex uplink/downlink configuration; or searching, by the network-side device, for a time division duplex uplink/downlink configuration of the UE stored by the network side in the same configuration mode as the indicated time division duplex uplink/downlink configuration, and replacing the stored time division duplex uplink/downlink configuration with the indicated time division duplex uplink/downlink configuration.

8. The method according to claim 6, wherein if both a static or semi-static time division duplex uplink/downlink configuration indicator and a dynamic time division duplex uplink/downlink configuration indicator are transmitted, then selecting, by the network-side device, the one of the indicated time division duplex uplink/downlink configuration and the time division duplex uplink/downlink configuration currently used by the UE comprises:
   selecting, by the network-side device, a time division duplex uplink/downlink configuration indicated by the dynamic time division duplex uplink/downlink configuration indicator; and
   after the network-side device transmits the time division duplex uplink/downlink configuration indicators, the method further comprises:
   replacing, by the network-side device, a time division duplex uplink/downlink configuration of the UE stored by the network side with the time division duplex uplink/downlink configuration indicated by the dynamic time division duplex uplink/downlink configuration indicator; or
   replacing, by the network-side device, a time division duplex uplink/downlink configuration of the UE stored by the network side, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator, and replacing the time division duplex uplink/downlink configuration of the UE stored by the network side, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator;

or
wherein if both a static or semi-static time division duplex uplink/downlink configuration indicator and a dynamic time division duplex uplink/downlink configuration indicator are transmitted, then selecting, by the network-side device, the one of the indicated time division duplex uplink/downlink configuration and the time division duplex uplink/downlink configuration currently used by the UE comprises:
selecting, by the network-side device, a time division duplex uplink/downlink configuration indicated by the static or semi-static time division duplex uplink/downlink configuration indicator; and
after the network-side device transmits the time division duplex uplink/downlink configuration indicators, the method further comprises:
replacing, by the network-side device, a time division duplex uplink/downlink configuration of the UE stored by the network side with the time division duplex uplink/downlink configuration indicated by the static or semi-static time division duplex uplink/downlink configuration indicator; or
replacing, by the network-side device, a time division duplex uplink/downlink configuration of the UE stored by the network side, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator, and replacing the time division duplex uplink/downlink configuration of the UE stored by the network side, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

9. The method according to claim 6, wherein if the UE does not support a dynamic time division duplex uplink/downlink configuration, then the method further comprises:
   determining, by the network-side device, whether the indicated time division duplex uplink/downlink configuration is a dynamic time division duplex uplink/downlink configuration after the network-side device transmits the time division duplex uplink/downlink configuration indicator; and
   if so, to determine the transmission direction of the each subframe for the UE according to the time division duplex uplink/downlink configuration currently used by the UE;
   otherwise, to determine the transmission direction of the each subframe for the UE according to the indicated time division duplex uplink/downlink configuration, and to replace the currently used time division duplex uplink/downlink configuration with the indicated time division duplex uplink/downlink configuration.

10. The method according to claim 6, wherein if the UE is determined to support a dynamic time division duplex uplink/downlink configuration, and the dynamic time division duplex uplink/downlink configuration of the UE is enabled, then the method further comprises:
   releasing, by the network-side device, an uplink or downlink semi-persistent scheduling resource corresponding to the UE;
   wherein after the dynamic time division duplex uplink/downlink configuration of the UE is disabled, the method further comprises:
   scheduling the UE using semi-persistent scheduling to transmit uplink/downlink semi-persistent scheduled data.

11. The method according to claim 6, wherein the method further comprises:
   obtaining, by the network-side device, a predetermined transmission direction of a subframe carrying data to be transmitted; and
   selecting, by the network-side device, the time division duplex uplink/downlink configuration in which the transmission direction of the subframe is the same as the pre-determined transmission direction of the subframe, so that the selected time division duplex uplink/downlink configuration is the time division duplex uplink/downlink configuration indicated by the time division duplex uplink/downlink configuration indicator;
   or
   the method further comprises:
   determining, by the network-side device, a subframe with a fixed transmission direction; and
   configuring, by the network-side device, uplink/downlink semi-persistent scheduling, a physical uplink control channel resource, a PRACH resource and/or a sounding reference signal resource in the subframe with the fixed transmission direction.

12. The method according to claim 6, wherein for the transmission with transmission time interval bundling, the indicated time division duplex uplink/downlink configuration is the time division duplex uplink/downlink configuration 0 or 1 or 6.

13. A UE, comprising:
   a processor configured to report a capability indicator to a network-side device to indicate whether the UE supports a dynamic time division duplex uplink/downlink configuration; and if the UE supports a dynamic time division duplex uplink/downlink configuration, to select one of an indicated time division duplex uplink/downlink configuration and a currently used time division duplex uplink/downlink configuration upon reception of a time division duplex uplink/downlink configuration indicator, and to determine a transmission direction of each subframe according to the selected time division duplex uplink/downlink configuration; and
   a transceiver, configured to receive and transmit data under the control of the processor;
   wherein the processor is further configured:
   if a predetermined transmission direction of a subframe carrying data to be transmitted is different from the transmission direction determined according to the selected time division duplex uplink/downlink configuration, to stop the data to be transmitted from being transmitted in the subframe carrying the data to be transmitted;
   if uplink or downlink semi-persistent scheduled data is transmitted in the subframe carrying the data to be transmitted, to release an uplink or downlink semi-persistent scheduling resource;
   if a physical uplink shared channel is initially transmitted or retransmitted in the subframe carrying the data to be transmitted, to release a hybrid automatic repeat request process corresponding to a physical layer uplink shared channel to be transmitted in the subframe; and
   if a sounding reference signal and/or a physical uplink control channel is transmitted in the subframe carrying the data to be transmitted, to instruct a radio resource control protocol layer to release a sounding reference signal and/or a physical uplink control channel configuration.

14. The UE according to claim 13, wherein the processor is further configured:
   to select the indicated time division duplex uplink/downlink configuration; and
   upon reception of the time division duplex uplink/downlink configuration indicator, to replace a time division duplex uplink/downlink configuration stored by the UE with the indicated time division duplex uplink/downlink configuration; or upon reception of the time division duplex uplink/downlink configuration indicator, to search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration;
   or
   the processor is further configured:
   to determine whether the time division duplex uplink/downlink configuration indicator is a dynamic time division duplex uplink/downlink configuration indicator, and if so, to select the indicated time division duplex uplink/downlink configuration; otherwise, to select the currently used time division duplex uplink/downlink configuration; and
   after determining whether the time division duplex uplink/downlink configuration indicator is a dynamic time division duplex uplink/downlink configuration indicator, if the time division duplex uplink/downlink configuration indicator is a dynamic time division duplex uplink/downlink configuration indicator, to replace a time division duplex uplink/downlink configuration stored by the UE with the indicated time division duplex uplink/downlink configuration; or after determining whether the time division duplex uplink/downlink configuration indicator is a dynamic time division duplex uplink/downlink configuration indicator, to search for a time division duplex uplink/downlink configuration stored by the UE in the same configuration mode as the indicated time division duplex uplink/downlink configuration, and to replace the stored time division duplex uplink/downlink configuration with the indicated time division duplex uplink/downlink configuration.

15. The UE according to claim 13, wherein the processor is further configured:
   if both a static or semi-static time division duplex uplink/downlink configuration indicator and a dynamic time division duplex uplink/downlink configuration indicator are received, to select a time division duplex uplink/downlink configuration indicated by the dynamic time division duplex uplink/downlink configuration indicator; and
   upon reception of the time division duplex uplink/downlink configuration indicators, to replace a time division duplex uplink/downlink configuration stored by the UE with the time division duplex uplink/downlink configuration indicated by the dynamic time division duplex uplink/downlink configuration indicator; or upon reception of the time division duplex uplink/downlink configuration indicators, to replace a time division duplex uplink/downlink configuration stored by the UE, which is in the same configuration mode as the time division duplex uplink/downlink configuration indicated by the dynamic time division duplex uplink/downlink configuration indicator, with the time division duplex uplink/downlink configuration indicated by the dynamic time division duplex uplink/downlink configuration indicator, and to replace a time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator;
or
the processor is further configured:
   if both a static or semi-static time division duplex uplink/downlink configuration indicator and a dynamic time division duplex uplink/downlink configuration indicator are received, to select a time division duplex uplink/downlink configuration indicated by the static or semi-static time division duplex uplink/downlink configuration indicator; and
   upon reception of the time division duplex uplink/downlink configuration indicators, to replace a time division duplex uplink/downlink configuration stored by the UE with the time division duplex uplink/downlink configuration indicated by the static or semi-static time division duplex uplink/downlink configuration indicator; or upon reception of the time division duplex uplink/downlink configuration indicators, to replace a time division duplex uplink/downlink configuration stored by the UE, which is in the same configuration mode as the time division duplex uplink/downlink configuration indicated by the dynamic duplex uplink/downlink configuration indicator, with the time division duplex uplink/downlink configuration indicated by the dynamic duplex uplink/downlink configuration indicator, and to replace a time division duplex uplink/downlink configuration stored by the UE, which is in the same configuration mode as the time division duplex uplink/downlink configuration indicated by the static or semi-static time division duplex uplink/downlink configuration indicator, with the time division duplex uplink/downlink configuration indicated by the static or semi-static time division duplex uplink/downlink configuration indicator.

16. The UE according to claim 13, wherein the processor is further configured:
   if the uplink or downlink semi-persistent scheduled data is stopped from being transmitted in the subframe carrying the data to be transmitted, to receive dynamic scheduling of the uplink or downlink semi-persistent scheduled data, in a subframe of which the transmission direction in the selected time division duplex uplink/downlink configuration is the same as a transmission direction of the uplink or downlink semi-persistent scheduled data.

17. A network-side device, comprising:
   a processor configured to determine whether a UE supports a dynamic time division duplex uplink/downlink configuration, according to a capability indicator reported by the UE; and if the UE supports a dynamic time division duplex uplink/downlink configuration, then after a time division duplex uplink/downlink configuration indicator is transmitted to the UE, to select one of an indicated time division duplex uplink/downlink configuration and a time division duplex uplink/downlink configuration currently used by the UE, and to determine a transmission direction of each subframe for the UE according to the selected time division duplex uplink/downlink configuration; and
   a transceiver configured to transmit and receive data under the control of the processor;
wherein the processor is configured:
   if a transmission direction, of a subframe carrying data to be transmitted, predetermined for the UE is different from the transmission direction determined for the UE according to the selected time division duplex uplink/downlink configuration, to stop the data to be transmitted from being transmitted in the subframe carrying the data to be transmitted; wherein,
      if uplink or downlink semi-persistent scheduled data is transmitted in the subframe carrying the data to be transmitted, to release an uplink or downlink semi-persistent scheduling resource;
      if a physical uplink shared channel is initially transmitted or retransmitted in the subframe carrying the data to be transmitted, to release a hybrid automatic repeat request process corresponding to a physical layer uplink shared channel to be transmitted in the subframe;
      if a sounding reference signal and/or a physical uplink control channel is transmitted in the subframe carrying the data to be transmitted, to instruct a radio resource control protocol layer to release a sounding reference signal and/or a physical uplink control channel configuration;
   wherein when the uplink or downlink semi-persistent scheduled data is stopped from being transmitted in the subframe carrying the data to be transmitted, then the processor further configured:

to schedule the uplink or downlink semi-persistent scheduled data, in a subframe of which the transmission direction in the selected time division duplex uplink/downlink configuration is the same as a transmission direction of the uplink or downlink semi-persistent scheduled data.

* * * * *